US011263386B1

(12) United States Patent
Beals et al.

(10) Patent No.: US 11,263,386 B1
(45) Date of Patent: Mar. 1, 2022

(54) OPTIMIZING THE DISPLAY OF HIERARCHICALLY ORGANIZED DATA IN A WEB APPLICATION

(71) Applicant: Splunk Inc., San Francisco, CA (US)

(72) Inventors: Trenton John Beals, Hayward, CA (US); Nuri Amari, Kingston (CA)

(73) Assignee: Splunk Inc., San Francisco, CA (US)

( * ) Notice: Subject to any disclaimer, the term of this patent is extended or adjusted under 35 U.S.C. 154(b) by 188 days.

(21) Appl. No.: 16/779,236

(22) Filed: Jan. 31, 2020

(51) Int. Cl.
| | |
|---|---|
| *G06F 3/048* | (2013.01) |
| *G06F 40/143* | (2020.01) |
| *G06F 40/106* | (2020.01) |
| *G06F 40/221* | (2020.01) |
| *G06F 16/9538* | (2019.01) |
| *G06F 16/957* | (2019.01) |
| *G06F 16/901* | (2019.01) |
| *G06F 40/166* | (2020.01) |
| *G06F 3/0485* | (2022.01) |

(52) U.S. Cl.
CPC ........ *G06F 40/143* (2020.01); *G06F 16/9027* (2019.01); *G06F 16/9538* (2019.01); *G06F 16/9577* (2019.01); *G06F 40/106* (2020.01); *G06F 40/166* (2020.01); *G06F 40/221* (2020.01); *G06F 3/0485* (2013.01)

(58) Field of Classification Search
None
See application file for complete search history.

(56) References Cited

U.S. PATENT DOCUMENTS

| 10,044,522 B1* | 8/2018 | Shamis | H04L 12/44 |
| 2015/0339268 A1* | 11/2015 | Bednarz, Jr | G06F 40/14 |
| | | | 715/248 |
| 2019/0332648 A1* | 10/2019 | Dejanovic | G06F 8/36 |

* cited by examiner

*Primary Examiner* — William C Trapanese
(74) *Attorney, Agent, or Firm* — Nicholson De Vos Webster & Elliott LLP

(57) ABSTRACT

Techniques are described for optimizing the display of hierarchically organized data by dynamically rendering portions visible within a display area of a web browser. Using a web page file corresponding to a web page that includes the display of a visual tree structure representing JavaScript Object Notation (JSON) data and client-side executable logic, an application running at the client device displays the web page including the visual tree structure and one or more first tree nodes corresponding to first JSON objects from a first portion of the JSON data. In response to input requesting display of one or more second JSON objects from a second portion of the JSON data not currently displayed in the visual tree structure, the application modifies one or more elements of the web page to update display of the visual tree structure to include one or more second tree nodes corresponding to the second JSON objects.

30 Claims, 13 Drawing Sheets

PLAYBOOKS MANAGEMENT INTERFACE 200

IT Operations Platform

Playbooks | Custom Lists

🔔 admin

PLAYBOOKS LIST 202

[🔄] [⬇] + PLAYBOOK

| Name | Label | Repo | Category | Status |
|---|---|---|---|---|
| Playbook 1 | Successful Executions: 10 | Failed Executions: 2 | Last Updated: Jan. 10, 2019<br>This playbook can be used to remediate virus-related incidents at endpoint devices. | events | community | IT ops | active |
| Playbook 2 | Successful Executions: 2 | Failed Executions: 0 | Last Updated: Dec. 30, 2018<br>This playbook can be used to geo-locate IP addresses. | events | community | Security | inactive |
| Playbook 3 | Successful Executions: 50 | Failed Executions: 5 | Last Updated: Nov. 10, 2018<br>This playbook can be used to quarantine endpoint devices. | events | community | Sample | inactive |
| Playbook 4 | Successful Executions: 20 | Failed Executions: 0 | Last Updated: Aug. 8, 2018<br>This playbook can be used to remediate virus-related incidents at endpoint devices. | campaign | private | Sample | active |
| Playbook 5 | Successful Executions: 0 | Failed Executions: 0 | Last Updated: Jan. 20, 2019<br>This playbook can be used to restart servers experiencing issues. | campaign | community | | inactive |

< ① 2 3 4 5 >     Show 5 ⌄

OPTIMIZING THE DISPLAY OF HIERARCHICALLY ORGANIZED DATA IN A WEB APPLICATION

RELATED APPLICATIONS

Any and all applications for which a foreign or domestic priority claim is identified in the Application Data Sheet as filed with the present application are incorporated by reference under 37 CFR 1.57 and made a part of this specification.

FIELD

At least one embodiment of the present disclosure relates to techniques for optimizing the display of hierarchically organized data by dynamically rendering portions of a visual tree representation of the data visible within a display area of a web browser.

BACKGROUND

Modem data centers and other computing environments can comprise anywhere from a few host computer systems to thousands of systems configured to process data, service requests from remote clients, and perform numerous other computational tasks. During operation, various components within these computing environments often generate significant volumes of machine-generated data ("machine data"). In general, machine data can include performance data, diagnostic information and/or any of various other types of data indicative of performance or operation of equipment in a computing system. Such data can be analyzed to diagnose equipment performance problems, monitor user interactions, and to derive other insights.

A number of tools are available to analyze machine-generated data. In order to reduce the volume of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may, for example, enable an analyst to investigate different aspects of the machine data that previously were unavailable for analysis. However, analyzing and searching massive quantities of machine data presents a number of challenges.

BRIEF DESCRIPTION OF DRAWINGS

Various embodiments in accordance with the present disclosure will be described with reference to the drawings, in which:

FIG. 2 illustrates an example interface used to manage digital playbooks associated with an IT operations platform according to some embodiments.

FIG. 9 illustrates another example GUI displaying a visual tree representation of JSON data according to some embodiments.

DETAILED DESCRIPTION

Figure 1:
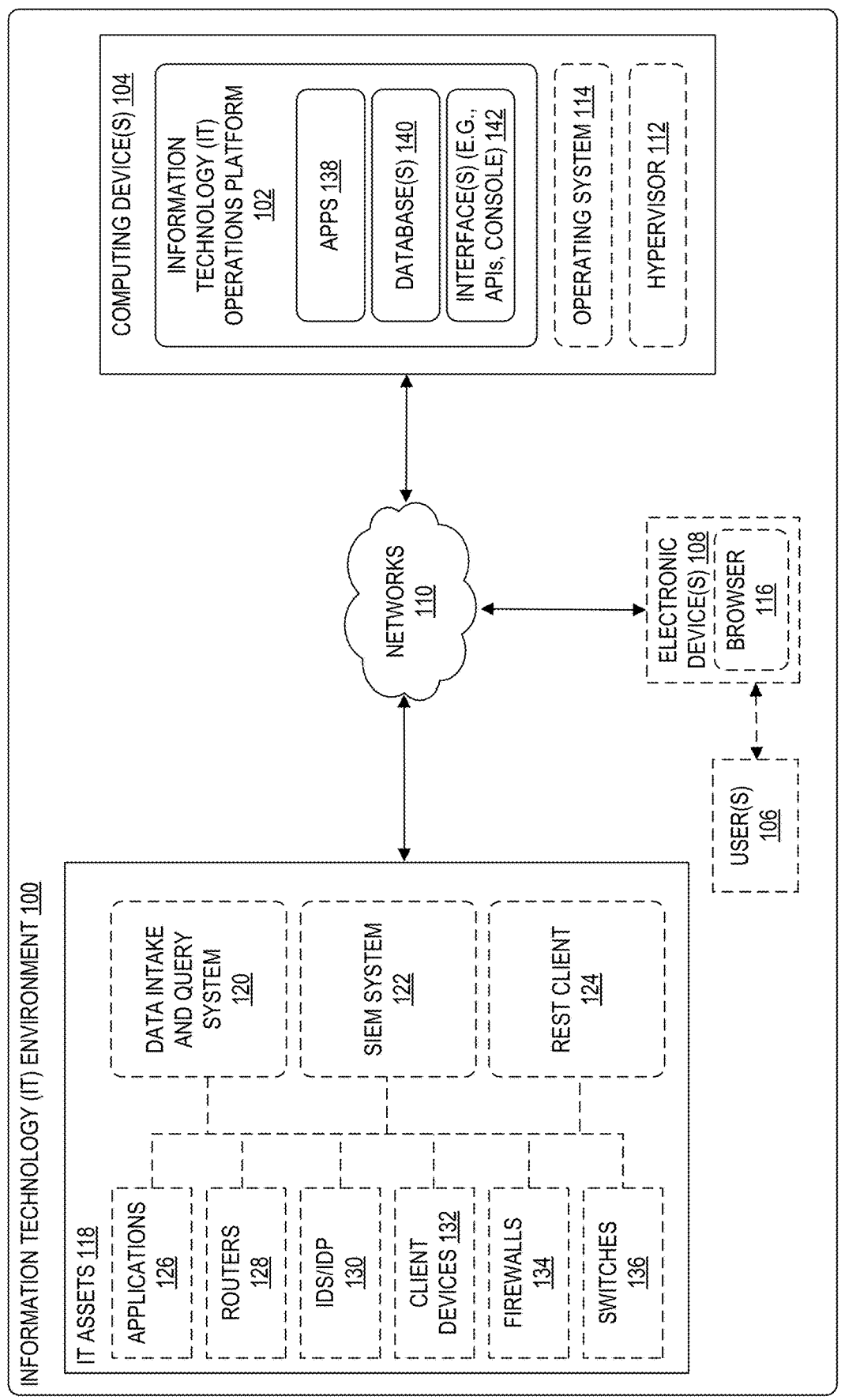
FIG. 1 is a block diagram illustrating an example networked computing environment including an information technology (IT) operations platform according to some embodiments.

Embodiments are described herein according to the following outline:

1.0. General Overview
 2.0. Information Technology (IT) Operations Application Overview
  2.1. Data Intake
  2.2. Actions
  2.3. Apps
  2.4. Assets
  2.5. Playbooks
   2.5.1. Playbook Management
   2.5.2. Playbook Creation and Configuration
   2.5.3. Playbook Execution
  2.6. Workbooks
 3.0. Displaying Hierarchically Organized Data Overview
 3.1. Network Environment
 3.2. Graphical User Interface (GUI) Examples
1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. To reduce the size of the potentially vast amount of machine data that may be generated, many of these tools typically pre-process the data based on anticipated data analysis needs. For example, pre-specified data items may be extracted from the machine data and stored in a database to facilitate efficient retrieval and analysis of those data items at search time. However, the rest of the machine data typically is not saved and is instead discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although some of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events." An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, and so forth.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as by Internet Protocol (IP) address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

2.0. Information Technology (it) Operations Platform Overview

As indicated above, the management of modern IT environments often involves managing a large number of devices and software operating within such environments. A system administrator of even a modestly-sized IT environment, for example, might be responsible for managing numerous servers, endpoint devices, firewalls, and various types of software products and services running on top of those devices. Systems such as the SPLUNK® ENTERPRISE system, as well as other various SIEM, security, and IT operations applications, provide ways to organize, analyze, diagnose, and provide intelligence related to these components of users' IT environments.

The management of IT environments often further includes responding to a wide variety of incidents that may occur over time and which may be indicated or derived from analysis of data generated by IT environment components, as described above. Such incidents can include security-related incidents (for example, viruses, network issues, etc.), IT component-related incidents (for example, hardware failures, software bugs, etc.), and any other events that potentially impact operation of an IT environment. These incidents can be flagged, and information related to the incidents may be provided to an administrator or other user to be analyzed for a possible solution. Once a possible solution is identified, the process for remediating such incidents can involve interacting with one or several components within the IT environment. In response to identifying a security-related issue involving an endpoint device, for example, a system administrator might use security software to quarantine the endpoint device, interact with a firewall to update network settings, among any number of other possible operations.

The ability to readily respond to incidents in an IT environment can be aided by using an IT operations platform, also sometimes referred to as an orchestration, automation, and response (OAR) platform, such as the SPLUNK® PHANTOM® system. An IT operations platform generally enables users to connect disparate collections of security and IT applications in users' IT environments and to automate tasks typically performed manually by system administrators and other users in response to identification of various types of IT-related incidents.

FIG. 1 is a block diagram illustrating an example networked computing environment including an IT operations platform according to some embodiments. In some embodiments, an IT operations platform 102 operates in a networked IT environment 100 and comprises one or more software components executed by one or more electronic computing devices 104. The computing devices 104 generally can be hosted at an on-premises or cloud-based computing environment, or a combination thereof, such that the IT operations platform 102 can be accessed by users 106 and used to interact with components of an organization's computing infrastructure. Users 106 using one or more electronic device(s) 108 (which may be part of or separate from the IT environment 100) can interact with the IT operations platform 102 via one or more networks 110. Networks 110 broadly represent one or more local area networks (LANs), wide area networks (WANs), cellular networks (e.g., Long-Term Evolution (LTE), High Speed Packet Access (HSPA), 3G, and other cellular technologies), and networks using any of wired, wireless, terrestrial microwave, or satellite links, and may include the public internet. Users 106 may interact with an IT operations platform 102 via one or more interfaces 142, such as through use of application programming interface (API) calls, via a console implemented as a website or application, etc.

In some embodiments, some or all the computing devices 104 and systems upon which an IT operations platform 102 operates may rely upon virtualization techniques. These virtualization technologies may include virtual machines (VMs) using a guest operating system 114 that operates using a hypervisor 112, where the hypervisor 112 itself may or may not further operate on top of an underlying host operating system. The virtualization technologies may additionally or alternatively include use of containers that may or may not operate in a VM, software that executes on computing device 104 hardware without an underlying hypervisor or other virtualization technology, or any other combination thereof.

In some embodiments, an IT operations platform 102 can be deployed as a virtual appliance at one or more computing devices 104 managed by an organization using the IT operations platform 102. A virtual appliance, for example, may comprise a VM image file that is pre-configured to run on a hypervisor 112 or directly on the hardware of a computing device 104 and that comprises a pre-configured operating system 114 upon which the IT operations platform 102 executes. In other embodiments, the IT operations platform 102 can be provided and installed using other types of standalone software installation packages or software package management systems. Depending on the implementation and user preference, an IT operations platform 102 optionally can be configured on a standalone server or in a clustered configuration across multiple separate computing devices 104. In other embodiments, an IT operations platform 102 can be hosted on computing devices 104 managed by an entity that is separate from the users 106 and provided to users 106 as a service (for example, as a service of a cloud-based service provider).

In some embodiments, a user initially configures an IT operations platform 102 using a virtual console screen or other interface of a VM hosting the IT operations platform 102, for example, to create and configure root and user accounts, configure network settings, and perform other possible configurations. Once a virtual appliance hosting an IT operations platform 102 is associated with an IP address and is reachable via a network 110, users 106 can access various interfaces of the IT operations platform 102, including a web-based console. For example, users 106 can use a web browser 116 or other application to navigate to the IP address or hostname associated with the IT operations platform 102 to access console interfaces used to interact with various aspects of the platform.

An IT environment 100 further includes any number of IT assets 118, for example, as part of a corporate network or other environment with which one or more users 106 are associated. In an embodiment, each of these IT assets 118 can serve as sources of incident data to an IT operations platform 102, an asset upon which actions can be performed by the IT operations platform 102, or both. The IT assets 118 can include various types of computing devices, software applications, and services including, but not limited to, a data intake and query system 120 (which itself can ingest and process machine data generated by other IT assets 118), a SIEM system 122, a REST client 124 that obtains and/or generates incident data based on the activity of other IT assets 118, software applications 126 (including operating systems, databases, web servers, etc.), routers 128, intrusion detection systems and intrusion prevention systems (IDS/IDP) 130, client devices 132 (for example, servers, desktop computers, laptops, tablets, etc.), firewalls 134, and switches 136. These IT assets 118 may execute upon any number separate computing device(s) and systems within the IT environment 100.

During operation, a data intake and query system 120, SIEM system 122, REST client 124, or other system components or combinations thereof, obtain operational, performance, and security data from other IT assets 118, analyze the data, and optionally identify potential IT-related incidents and send data indicating such incidents to the IT operations platform 102. Once a data intake and query system 120 identifies a possible security threat or other IT-related incident based on data ingested by the data intake and query system 120, for example, data representing the incident can be sent to the IT operations platform 102 (for example, formatted as JavaScript Object Notation (JSON) data or using other possible data formats). As described in more detail herein, the IT operations platform 102 obtains and analyzes such incident data to determine possible actions to perform to remediate or otherwise respond to such incidents. These actions can include default actions that can be initiated and performed within the IT environment 100 without interaction from an administrator or other user and can further include providing suggested actions to one or more users 106. Once the suggested actions are determined, for example, these actions can be presented in an administration console or other interface accessible to users 106. Based on the suggested actions, a user 106 can select one or more particular actions to be performed and the IT operations platform 102 can carry out the selected actions within the IT environment 100.

In some embodiments, to execute actions responsive to identified incidents, an IT operations platform 102 uses a unified security language to perform actions across a variety of hardware and software products, applications, and services. To execute a command specified using the unified language, for example, the IT operations platform 102 uses one or more apps 138 to translate the commands into the one or more processes or languages necessary to implement the action at one or more particular IT assets 118. For example, a user 106 might provide input requesting the IT operations platform 102 to remove an identified malicious process from multiple computing systems in the IT environment 100, where two or more of the computing systems are associated with different software configurations (for example, different operation systems or operating system versions). Accordingly, the IT operations platform 102 translates the command from the administrator into the necessary processes to remove each instance of the malicious process on the varying computing systems.

In some embodiments, an IT operations platform 102 enables users to automate actions or series of actions by creating digital "playbooks" that can be executed by the IT operations platform 102. At a high level, a playbook is a customizable computer program that can be executed by an IT operations platform 102 to automate a wide variety of possible operations related to an IT environment 100. These operations—such as quarantining devices, modifying firewall settings, restarting servers, and so forth—are typically performed by various security products by abstracting product capabilities using an integrated "app model." Additional details related to operation of the IT operations platform 102 and use of digital playbooks are provided elsewhere herein.

2.1. DATA INTAKE

The operation of an IT operations platform 102 generally begins with the ingestion of data related to various types of incidents involving one or more IT assets 118 of an IT environment 100. In one embodiment, users 106 configure an IT operations platform 102 to obtain, or "ingest," data from one or more defined data sources, where such data sources can be any type of computing device, application, or service that supplies information that users may want to store or act upon. As indicated above, examples of data sources include, but are not limited to, a data intake and query system 120 such as the SPLUNK® ENTERPRISE system, a SIEM system 122, a REST client 124, applications 126, routers 128, intrusion detection systems (IDS)/intrusion prevention systems (IDP) systems 130, client devices 132, firewalls 134, switches 136, or any other source of data identifying potential incidents in an IT environment. Some of these data sources may themselves collect and process data from various other data generating components such as, for example, web servers, application servers, databases, firewalls, routers, operating systems, and software applications that execute on computer systems, mobile devices, sensors, Internet of Things (IoT) devices, etc. The data generated by the various data sources can be represented in any of a variety of data formats.

In an embodiment, data ingested from configured data sources is represented in the IT operations platform 102 by "containers." A container is a structured representation of an incident or other type of data ingested from a data source and that can be used throughout the IT operations platform 102.

In some embodiments, an IT operations platform 102 can be configured to create and recognize different types of containers depending on the corresponding type of data ingested, such as "incident containers" for IT-related incidents, or "security event containers" for security-related incidents, and so forth. A container can further include any number of "artifacts," where each artifact represents an item of data associated with the container. For example, a container used to represent data ingested from an anti-virus service and representing security-related incidents may include artifacts indicating a name of the virus, an associated hash value, a file path on the infected endpoint, and so forth.

In an embodiment, the IT operations platform 102 stores various data related to its operation, including container data created based on data ingested from IT assets, playbook data, user account settings, configuration data, and so forth, in one or more database(s) 140. These database(s) 140 may operate on a same computer system as the IT operations platform 102 or at one or more separate database instances.

In some embodiments, an IT operations platform 102 enables users to configure an instance of the platform to support multi-tenancy. A multi-tenant configuration, for example, can enable users of a security team to manage assets associated with multiple independent third-party organizations for which the security team is responsible while maintaining data separation and security among the configured assets and data of each organization. Users and user teams can thus use this feature to perform incident response for multiple third-party organizations on one instance of the IT operations platform 102 and using only a single login and permissions configuration.

In an embodiment, users can create custom data sources using a REST client 124. For example, a REST client can be configured to monitor one or more IT assets 118 for incidents and use APIs 142 provided by the IT operations platform 102 to create, update, and remove data from an IT operations platform 102 corresponding to the incidents.

2.2. Actions

In an embodiment, the IT operations platform 102 defines many different types of "actions," which are high-level, vendor- and product-agnostic primitives that can be used throughout the IT operations platform 102. At a high level, actions represent simple and user-friendly verbs that are used to execute actions in playbooks and manually through other user interfaces of the IT operations platform 102. In general, a same action defined by the IT operations platform 102 can be carried out on assets associated with different vendors and/or configurations, where the translation of an action for use at a particular asset is performed by various "apps" of the platform, as described below. Examples of actions that may be defined by an IT operations platform 102 include, for example, "get process dump," "block IP address," "suspend VM," "terminate process," etc.

2.3. Apps

In an embodiment, an IT operations platform 102 enables connectivity with various IT assets 118, including those from various third-party IT and security technologies, and the ability to execute actions at those assets via "apps" 138. In general, an app 138 represents program code that provides an abstraction layer (e.g., via a library, API, or other interface) to one or more of hundreds of possible IT and security-related products and services, and which exposes lists of actions that are supported by those products and services. Each app 138 may also define which types of assets that the app can operate on.

As one example, an IT operations platform 102 may be configured with an app 138 that enables the platform to communicate with a VM product provided by a third-party vendor. In this example, the app for the VM product enables the platform 102 to take actions relative to VM instances within a user's IT environment, including starting and stopping the VMs, taking VM snapshots, analyzing snapshots, and so forth. In order for the app to communicate with individual instances, the app 138 can be configured with login credentials, hostname or IP address, and so forth, for each instance with which communication is desired. Other apps 138 may be available for VM products from other third-party vendors, where those apps are configured to translate some or all of the same actions that are available with respect to the first type of VM product. In general, apps 138 can enable interaction with virtually any type of IT asset 118 in an IT environment and can be added and updated over time to support new types of assets.

2.4. Assets

In an embodiment, IT assets 118 are instances of physical or virtual components within an organization with which an IT operations platform 102 communicates (for example, via apps as described above). Examples of IT assets 118 include, but are not limited to, servers, endpoint devices, routers, and firewalls. In the context of an IT operations platform 102, an IT asset 118 is represented by data identifying the asset, including information used to communicate with the device or service (for example, an IP address, automation service account, username, password, and so forth). In an embodiment, one or more IT assets 118 can be configured as a source of incident information that is ingested by an IT operations platform 102. The types of IT assets 118 that can be configured in the IT operations platform 102 may be determined in some cases based on what apps 138 are installed, as described above. In some embodiments, automated actions can be configured with respect to various IT assets 118 using playbooks, described in more detail elsewhere herein.

2.5. Playbooks

In some embodiments, the operation of an IT operations platform 102 includes the ability to execute customizable playbooks. At a high level, a playbook comprises computer program code and possibly other data that can be executed by an IT operations platform 102 to carry out an automated set of actions. In one embodiment, a playbook is comprised of one or more functions or codeblocks, where each codeblock contains program code that performs defined functionality when the codeblock is encountered during execution of the playbook of which it is a part. For example, a first codeblock may implement an action that is performed relative to one or more IT assets 118, another codeblock might filter data generated by the first codeblock in some manner, and so forth. A playbook is further associated with a control flow that defines an order in which the codeblocks of the playbook are executed, where a control flow may vary at each execution depending on particular input conditions.

The IT operations platform 102 described herein provides graphical user interfaces (GUIs) including a visual playbook editor that allows users to visually create and modify playbooks. Using a visual playbook editor GUI, for example, users can codify a playbook by creating and manipulating a displayed graph including nodes and edges, where each of the nodes in the graph represents a codeblock that performs one or more defined operations during execution of the playbook, and where the edges represent the control flow among the playbook's codeblocks. In this manner, users can craft playbooks that perform complex sequences of operations without having to write some or any of the underlying code. The visual playbook editor interfaces further enable users to supplement or modify the automatically generated code by editing the code associated with a visually-designed playbook, as desired.

2.2.1. Playbooks Management

In an embodiment, an IT operations platform 102 provides one or more playbook management interfaces that enable users to locate and organize playbooks associated with a user's account. A playbook management interface, for example, can display a list of playbooks that are associated with a user's account and further provide information about each playbook such as, for example, a name of the playbook, a description of the playbook's operation, a number of times the playbook has been executed, a last time the playbook was executed, a last time the playbook was updated, tags or labels associated with the playbook, a repository at which the playbook and the associated program code is kept, a status of the playbook, and so forth.

FIG. 2 illustrates an example playbook management interface according to some embodiments. As shown in FIG. 2, the playbook management interface 200 includes a playbook list 202. As indicated above, a playbook list 202 includes several columns indicating information about each playbook including, for example, a name of the playbook, one or more labels associated with each playbook, a repository at which the playbook is kept, a category associated with each playbook, and a status of the playbook. In an embodiment, a user can also use interface elements 204 to sort the list of displayed playbooks, refresh the playbook list, download an exported copy of one or more playbooks, or create a new playbook, among other possible operations. In an embodiment, a user can also provide input selecting a playbook to view in the visual playbook editor so that the user can modify the selected playbook, if desired.

2.5.2 Playbook Creation and Configuration

In an embodiment, users can create a new digital playbook starting from a playbook management interface, as described in reference to FIG. 2, or using another interface provided by the IT operations platform 102. Using the playbook management interface 200, for example, a user can select the "create new playbook" interface element from interface elements 204. Once a user has provided input requesting the creation of a new playbook, the IT operations platform 102 displays a visual playbook editor interface including a graphical canvas on which users can add nodes representing operations to be performed during execution of the playbook, where the operations are implemented by associated source code that can be automatically generated by the visual playbook editor, and connections or edges among the nodes defining an order in which the represented operations are performed upon execution.

Figure 3:
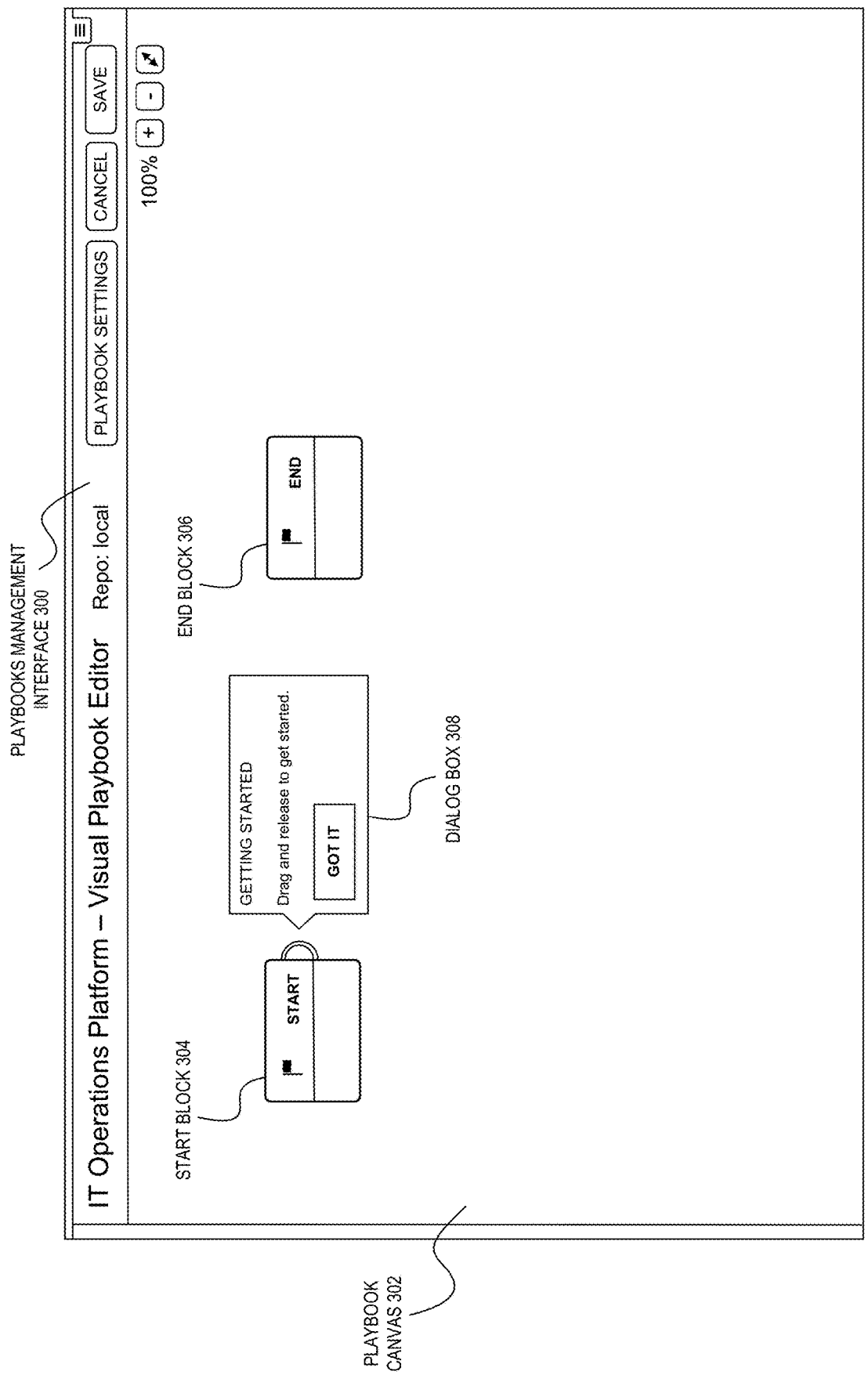
FIG. 3 illustrates an example visual playbook editor interface used to create a digital playbook according to some embodiments.

FIG. 3 illustrates a visual playbook editor canvas that can be used to visually design a playbook. As illustrated in FIG. 3, a visual playbook editor interface 300 includes a playbook canvas 302 initially including two nodes corresponding to a start block 304 and an end block 306, respectively, where those nodes represent a start and end point for execution of the playbook being designed. In the illustrated example, the visual playbook editor interface 300 further displays an example dialog box 308 instructing a user to select the start block 304 and to create an edge or connection originating from the start block 304 to add a new block to the playbook. As described in more detail below, the visual playbook editor interface 300 enables users to add various types of blocks to a playbook including, for example, playbook blocks, decision blocks, filter blocks, action blocks, format blocks, prompt blocks, task blocks, and API blocks.

In an embodiment, one type of block that can be added to a playbook is an action block. Once an action block is added to a playbook, the visual playbook editor interface can guide the user in selecting an action to be performed when the action block is encountered during execution of the playbook. The action block can optionally be further configured using various items of data accessible to the action block including, for example, data stored as part of a container and associated artifacts as well as other output variables generated by other playbook blocks. For example, if a user adds an action block that performs the operation of geolocating an IP address, a user may configure the action block to use an IP address corresponding to a selected artifact of a container that initiated the playbook's execution, or based on an IP address obtained by an upstream block using other processes.

In an embodiment, another type of block that a user can add to a playbook is a prompt block. A prompt block is generally used to add user interaction to a playbook by causing information to be requested from one or more users at a particular point during execution of the playbook. The information requested and provided by a user can be used by other downstream blocks of the playbook. For example, a playbook might include an action block that detects the presence of potentially malicious IP addresses, a serially-connected prompt block that presents information to a user about the detected potentially malicious IP address and requests a yes/no response from the user indicating whether the IP address should be blocked, followed by another serially-connected action block that either blocks the IP address at a firewall or not depending on the input received from a user in response to the prompt block.

In an embodiment, a prompt block is associated with various properties that can be configured by a user using a visual playbook editor including, for example, configurations indicating a prompt approver, a required response time, a message prompt, and a response type. The assignment of a prompt approver indicates an individual user or user role (e.g., administrator, engineer, manager) that is to receive the prompt to be acted upon during execution of the corresponding playbook. A required response time indicates an amount of time that an assigned approver or set of approvers have to complete the prompt, for example, by accessing the prompt and providing any requested information and/or performing actions specified by the prompt. A message prompt is information that is displayed to a user when the user accesses an assigned prompt (for example, a message prompt can be presented as part of a GUI interface element displayed to a user accessing an assigned prompt). A response type indicates a type of acceptable response that can be provided by a user to successfully complete the prompt (for example, ayes/no response, a numerical value response, a text-based response, a response from an enumerated list of options, etc.).

In some embodiments, a user accesses a prompt that has been generated for the user during execution of a playbook via a notification presented in a "mission control" or other type of interface of the IT operations platform 102. In response to a user accessing an assigned prompt (for example, by providing input selecting a notification indicating the existence of the prompt), the IT operations platform 102 causes display of an interface element that includes a message indicating what information is being requested from the user. A user assigned a prompt can either complete the prompt (that is, access the prompt and provide any requested data), delegate the prompt to a different user, or allow the deadline for responding to the prompt to time out.

A prompt is successfully completed when either the designated user, or a user to whom the prompt is delegated, completes the prompt. If a prompt is assigned to a group of users, a prompt can be successfully completed when either at least one user of the group completes the prompt, or when all users of the group complete the prompt, depending on how the prompt is configured.

In an embodiment, yet another type of function block that can be added to a playbook is a task block. A task block is generally configured to send a message to a user or group of users to be acknowledged by the users. A task block can be further configured by specifying an approver (that is, a user or user role to whom the task is sent), a response deadline (for example, expressed in minutes from the time at which the task is generated), a message to be displayed to the user(s), among other possible configurations.

In an embodiment, yet another type of block that can be added to playbooks in a visual playbook editor is a decision block. A decision block generally can be used to control program flow associated with the playbook. For example, during execution of a playbook, a decision block can be used to determine whether the execution flow proceeds next to a block A or to a block B (or block C, and so forth) depending on the outcome of one or more logical conditions defined by the decision block. These logical conditions, for example, can be based on comparisons involving artifact data, container properties, date functions, action results, among other possible types of input data. The use of a decision block in a playbook, for example, is conceptually similar to an if-then conditional statement found in high-level programming languages.

In an embodiment, yet another type of block that can be included in a playbook is an API block. An API block can be used, for example, to set various parameters associated with an incident container upon which the playbook is executing or to interact with the IT operations platform 102 in other ways supported by an associated API. For example, an API block can be used to set a severity level associated with an incident container, to indicate that the incident container is resolved, to associate a label with the incident container, add a comment to the container, among other possible operations.

In an embodiment, the creation of a graph representing a playbook includes the creation of connections between function blocks, where the connections are represented by edges that visually connect the nodes of the graph representing the collection of function blocks. These connections among the playbook blocks indicate a program flow for the playbook, defining an order in which the operations specified by the playbook blocks are to occur. For example, if a user creates a connection that links the output of a block A to the input of a block B, then block A executes to completion before execution of block B begins during execution of the playbook. In this manner, output variables generated by the execution of block A can be used by block B (and any other subsequently executed blocks) during playbook execution.

In an embodiment, users can create connections that link function blocks of a playbook in parallel. For example, a user can create a connection that links the output of a function block A to the input of a function block B and separately to the input of a function block C. In this example, the IT operations platform 102 can execute the operations defined by function blocks B and C in parallel, although the exact ordering of the execution may not be guaranteed. For some playbooks, the execution of two or more function blocks in parallel may provide a performance benefit compared to executing the function blocks serially.

In an embodiment, the visual representation of a playbook in a visual playbook editor, comprising a collection of nodes and edges, can be modified over time. Users can provide input via the visual playbook editor interface, for example, to rearrange the location of and connection between nodes in the graph and the visual playbook editor can route existing connections among the nodes accordingly such that an easily understandable visual representation is provided. In some embodiments, multiple nodes can be selected and moved around the canvas as a group.

2.5.3. Playbook Execution

Once a user has codified a playbook using a visual playbook editor or other interface, the playbook can be saved (for example, in a database 140 and in association with one or more user accounts) and run by the IT operations platform 102. As illustrated in the example playbooks above, a playbook includes a "start" block that is associated with source code that begins execution of the playbook. More particularly, the IT operations platform 102 executes the function represented by the start block for a playbook with container context comprising data about the incident upon which the playbook is executed, where the container context may be derived from input data from one or more configured data sources. A playbook can be executed manually, for example, in response to a user providing input requesting execution of the playbook, or playbooks can be executed automatically in response to the IT operations platform 102 obtaining input events matching certain criteria. In embodiments where the source code associated with a playbook is based on an interpreted programming language (for example, such as the Python programming language), the IT operations platform 102 can execute the source code represented by the playbook using an interpreter and without compiling the source code into compiled code. In other examples, the source code associated with a playbook can first be compiled into byte code or machine code and executed by the IT operations platform 102.

2.6. Workbooks

Some IT operations platforms, such as the SPLUNK® PHANTOM® platform, include the ability for users to create, customize, and use "workbooks." At a high level, a workbook enables users to codify an organization's standard operating procedures (SOPs) and other defined processes for responding to incidents (e.g., security threats, operational issues, etc.) within an IT environment into reusable templates. In some embodiments, a workbook is comprised of one or more user-defined phases (e.g., detection, analysis, containment, eradication, recovery, etc., in the context of a security investigation), where each phase includes one or more user-defined tasks to be performed by assigned analysts or other users. A workbook in this way defines an overall procedure that helps efficiently guide users of an IT operations platform through the process of responding to, documenting, and reporting incidents when they occur. Different workbook templates can be defined for responding to different types of incidents—for example, one workbook template might be created to help analysts investigate and respond to computer security incidents, another workbook template can be created to help analysts recover from and report significant hardware failures, and so forth. In some examples, workbook templates can be created to help analysts carry out various industry-wide SOPs (e.g., the NIST-800-61 standard for responding to computer security incidents).

In some embodiments, each task defined as part of a workbook template can be optionally associated with one or more automated actions or playbooks that can be executed by the IT operations platform 102 to help to carry out the task. For example, if a workbook includes a task of obtaining a particular log file at one or more endpoint devices associated with an incident, that task can be associated with an automated action or playbook for obtaining the relevant log files without additional manual user involvement. A user may specify a set of one or more executable actions, playbooks, or a combination thereof, in association with some or all of a workbook's tasks as part of the workbook template configuration process. In some embodiments, the IT operations platform 102 can additionally or alternatively automatically associate actions and playbooks with particular tasks, for example, by matching tasks to possible actions/playbooks based on an analysis of the text or other attributes associated with phase/task definitions.

In some embodiments, an IT operations platform 102 includes various GUIs that enable users to interact with workbooks. For example, in response to the IT operations platform 102 identifying an occurrence of a particular type of incident, the IT operations platform 102 may instantiate a new workbook based on a previously defined workbook template associated with that type of incident (e.g., if a malware attack is identified, the IT operations platform 102 can create a new workbook based on a computer security incident workbook template). Once a new workbook is created, analysts can use these interfaces to complete assigned tasks and to view the workbook's progress. Users can perform assigned workbook tasks, for example, either by manually performing the tasks or by selecting one or more automated actions or playbooks associated with the task. Icons or other graphical elements representing the automated actions and playbooks associated with the various workbook tasks can be graphically displayed, for example, such that a user can execute associated actions/playbooks simply by selecting a corresponding interface element in a workbook GUI.

In some embodiments, an IT operations platform 102 further optimizes the presentation of executable actions and playbooks displayed in connection with workbook tasks. For example, instead of displaying the actions and playbooks associated with workbook tasks in an arbitrary order, the IT operations platform 102 can monitor and log the efficacy of each action and playbook over time and use such data to determine a prioritized order in which to display the actions/playbooks in a workbook (or determine whether to display particular actions or playbooks at all). For example, when an action associated with a task is executed, the IT operations platform 102 can monitor the action's execution and determine whether the action executed successfully (e.g., if an action is configured to terminate a process running on an endpoint device, the IT operations platform 102 can determine whether the action was actually able to successfully connect to the endpoint device and terminate the process). This information can be collected over time and used, for example, to display actions/playbooks associated with various tasks in an order that reflects how successful each action/playbook historically has been in completing the task so that analysts can be guided to those actions/playbooks most likely to successfully complete a task.

Figure 4:
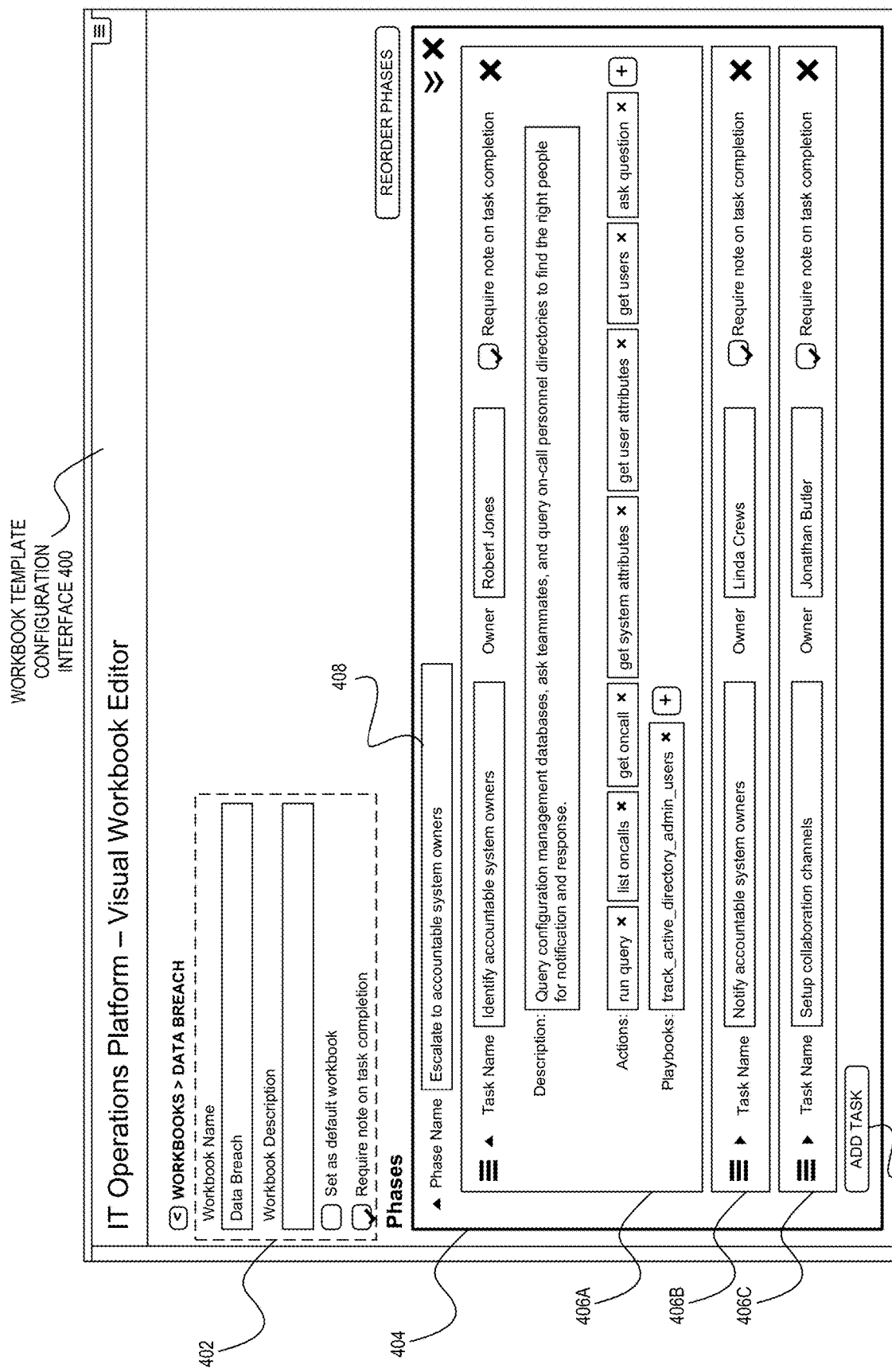
FIG. 4 illustrates an example workbook template configuration interface used to create a workbook according to some embodiments.

As indicated above, an IT operations platform 102 may include various GUIs that can be used to define workbook templates and to interact with workbook instances. FIG. 4 illustrates an example workbook template configuration interface used to create a workbook template according to some embodiments. As illustrated in FIG. 4, a workbook template configuration interface 400 includes interface elements for specifying information about a workbook template generally, and additional interface elements used to define the phases and tasks associated with the workbook.

In some embodiments, the workbook template configuration interface 400 includes a set of workbook information options 402, including fields for entry of a workbook name and workbook description, an interface element that can be used to set the current workbook as a default workbook, and an interface element that can be used to designate whether users are required to create a note upon completion of workbook tasks. In some embodiments, the workbook template configuration interface 400 further includes a phases definition panel 404. The example shown in FIG. 4 illustrates the definition of a single phase; however, a workbook template generally can include any number of separate phases as desired by the user. As illustrated in FIG. 4, the phases definition panel 404 include a field 408 for entry of a phase name and an add task button 410 used to add tasks to the phase. In FIG. 4, an example "Data Breach" workbook template includes a phase named "Escalate to accountable system owners." The phase named "Escalate to accountable system owners" includes three tasks: a task 406A named "Identify accountable system owners," a task 406B named "Notify accountable system owners," and a task 406C named "Setup collaboration channels." Each of the tasks 406A-406C includes fields for the task name and the owner (e.g., a user who can be designated as being responsible for the associated task), and a selector button to designate that a notification should be sent upon completion of the task. In response to selecting a specific task within a phase, the workbook editor displays additional options for the corresponding task. As illustrated in FIG. 4, selected task 406A includes a field for entry of text for a description of the task, in addition to options to add or remove executable actions and playbooks. The set of executable actions associated with task 406A includes the track_active_directory_admin_users playbook, as well as individual actions, including run query, list oncalls, get oncall, get system attributes, get user attributes, get users, and ask question.

Figure 5:
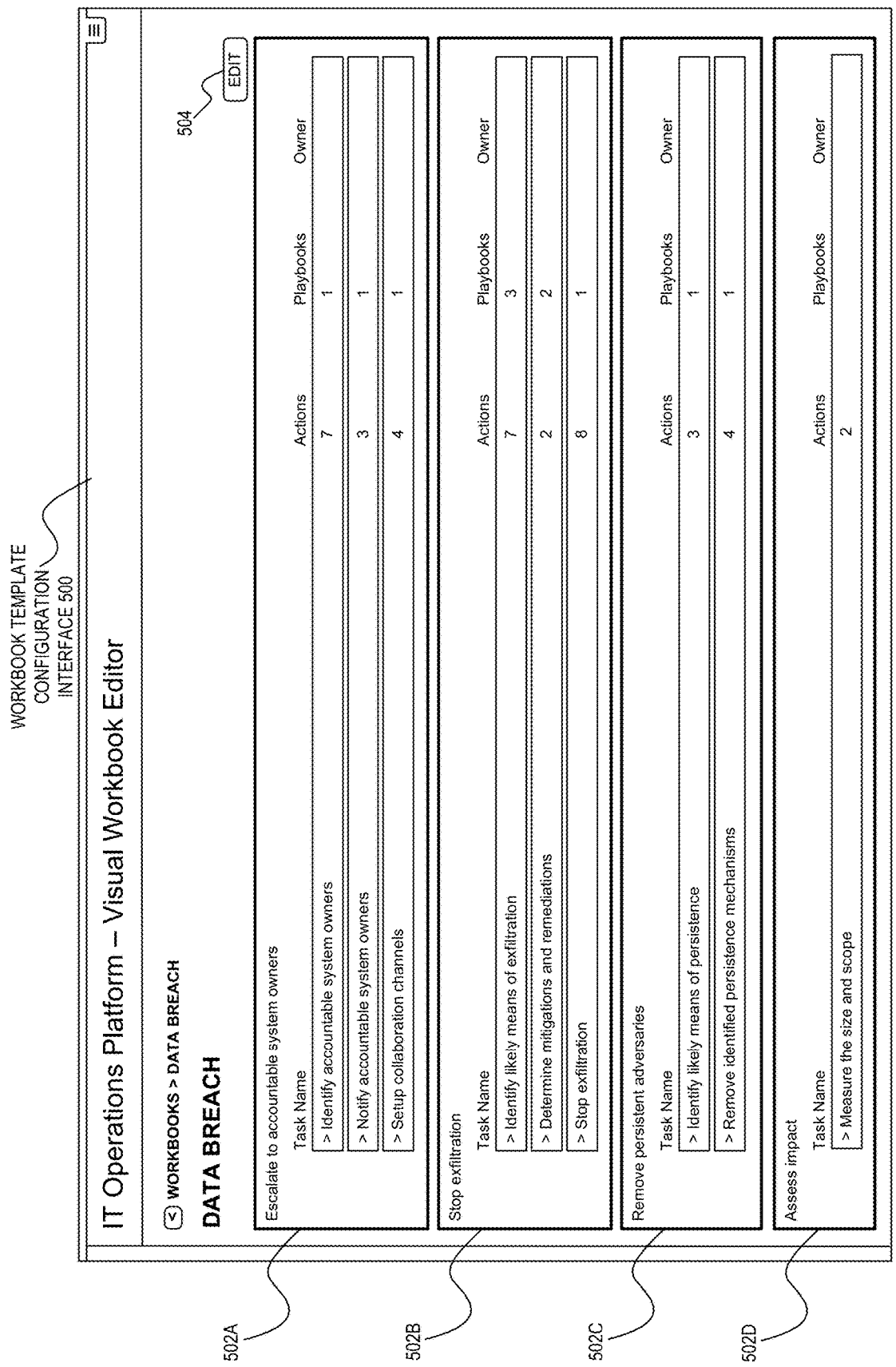
FIG. 5 illustrates an example workbook template review interface displaying information about a defined workbook template according to some embodiments.

FIG. 5 illustrates an example workbook template review interface displaying information related to a defined workbook template according to some embodiments. For example, as illustrated in the workbook template review interface 500 shown in FIG. 5, the phases of a created "Data Breach" workbook template include: a phase 502A labeled "Escalate to accountable system owners," a phase 502B labeled "Stop the exfiltration," a phase 502C labeled "Remove persistent adversaries," and a phase 502D labeled "Assess impact." Additional phases not pictured can include, for example, phases labeled "Report to appropriate stakeholders" and "Prevent future breaches." As illustrated in FIG. 5, the tasks associated with the phase 502B include: "Identify likely means of exfiltration," "Determine mitigations and remediations," and "Stop exfiltration"; the tasks associated with phase 502C include: "Identify likely means of persistence" and "Removed identified persistence mechanisms"; and the task for phase 502D include: "Measure the size and scope." The workbook template review interface 500 further displays, for each task, an indication of a number of actions and playbooks associated with the task, as well as an owner of the task, if any. A user can select an edit button 504 to further configure the workbook template, if desired.

Further examples of a data intake and query system and IT and security operations application upon which embodiments may be implemented are described in U.S. patent application Ser. No. 16/657,964, entitled "ANALYZING DATA ACROSS TENANTS OF AN INFORMATION TECHNOLOGY (IT) AND SECURITY OPERATIONS APPLICATION", filed on 18 Oct. 2019, and which is hereby incorporated by reference in its entirety for all purposes.

3.0. Displaying Hierarchically Organized Data Overview

Web browsers and other similar applications are capable of displaying web resources (e.g., web pages) obtained from host devices (e.g., web servers, storage servers, etc.). In some instances, the resources to be displayed by a web browser include the display of data found within JavaScript Object Notation (JSON) files (or other types of hierarchically structured data) to users in a manner that illustrates the hierarchical structure of the data. One example of a way in which JSON data and other similar types of data may be presented is using a visual and interactive tree structure that includes (a) nodes corresponding to the JSON objects in a JSON file, and (b) indications of parent/child node relationships corresponding to the hierarchical relationship of the JSON objects (e.g., using directed edges between the nodes, indentations of the nodes in a list, or other visualization of the node relationships). For example, a web page might be constructed such that, for every JSON object in a JSON file to be displayed, a corresponding Hypertext Markup Language (HTML) element is included in the web page so that all JSON tree nodes are rendered as part of the web page once received by a web browser. However, as the size of a JSON file to be displayed in a web page increases (e.g., a file including thousands, hundreds of thousands, or more JSON data objects), the ability for a web browser to process and render a web page including HTML elements for every JSON data object in the file becomes strained.

As one example of a web application that might display JSON objects, an IT and security operations application as described above might include various web pages that include the ability for users to view and navigate the contents of JSON files. The JSON files to be displayed in such an application might, for example, relate to incidents identified by the IT and security operations application, to results of security action executions, or to any other aspect of the IT and security operations application. In many instances, these JSON files can be quite large, thus making it challenging to present a visual tree representation of the data in a manner that performs well on a wide range of client devices.

The present disclosure relates to methods, apparatus, systems, and non-transitory computer-readable storage media for improving the display of interactive representations of hierarchically organized data (e.g., JSON data) within client-side applications, such as web browsers. According to embodiments herein, a web application is configured to provide web pages that include a visual tree representation of JSON data in a manner that can be efficiently rendered for display within such client-side applications. In some embodiments, the efficient rendering of these visual tree representations is managed in part by client-side code (e.g., JavaScript) that is capable of generating an efficient representation of JSON data contained in a JSON file to be displayed, using this representation of the JSON data to create HTML elements for only those JSON objects that are in a current display area of a browser viewing the web page (e.g., by dynamically generating the HTML elements and inserting those elements into the Document Object Model (DOM) representation of the web page), and dynamically updating those HTML elements corresponding to the visual tree representation as the display area of the client-side application changes (e.g., to insert, remove, or modify the HTML elements as a user scrolls a display window, expands or collapses tree nodes, etc.).

In some embodiments, a host server receives a request from a client device to access a web page that includes the display of a visual tree structure representing JSON objects stored in a JSON file. For example, the requested web page may be part of an IT operations and security application, as described herein. In response to the request, the host device sends response data including (a) a web page file, such as HTML, Extensible Markup Language (XML), etc., corresponding to the web page and (b) client-side executable logic (e.g., JavaScript). In some embodiments, a web browser executes the client-side executable logic to generate a separate representation of the contents of the JSON file (e.g., a list data structure). In such embodiments, the list data structure includes data indicating relationships between JSON objects (e.g., parent-child, child-sibling, etc.) in the JSON file, and a current state of JSON objects (e.g., expanded, collapsed, etc.). The client-side executable logic further determines a portion of the JSON data to display in a display area of the client web browser. For example, based on the size of the display area of the client web browser and a row height for each JSON object, the client-side executable logic calculates a number of rows of JSON objects that can fit in the display area. In some embodiments, the client-side executable logic includes one or more additional rows of JSON objects into the determined portion of the JSON data (e.g., as a buffer to pre-render adjacent JSON objects, etc.). Based on this determination, the client-side executable logic inserts HTML elements corresponding to the determined portion of the JSON data from the separate representation of the contents of the JSON file into the web page.

In response to user interactions with the visual tree structure on the web page (e.g., scrolling up/down, expanding/collapsing nodes, searching, etc.), the client-side executable logic updates/modifies the web page document to display the appropriate portion of the JSON data in the display area of the client web browser. For example, the client-side executable logic determines whether the user interaction requests display of JSON objects that are not part of the current portion of the JSON data being displayed. In response, the client-side executable logic dynamically modifies the web page by removing, adding, or modifying the HTML elements. The client-side executable logic further updates the list data structure with the updated states of JSON objects, if necessary. In this manner, HTML elements corresponding to other portions of the JSON data are not generated until input is received requesting display of the other portions (e.g., by scrolling the page to those portions, expanding/collapsing tree nodes, etc.), thereby significantly reducing a size of the web page to be displayed by the browser and improving the ability for web browsers to readily display the tree representation.

Various other features of the client-side executable logic will become apparent from the description which follows. First, however, it is useful to consider an example of an environment and system in which the application may be employed, as will now be described.

3.1. Network Environment

Figure 6:
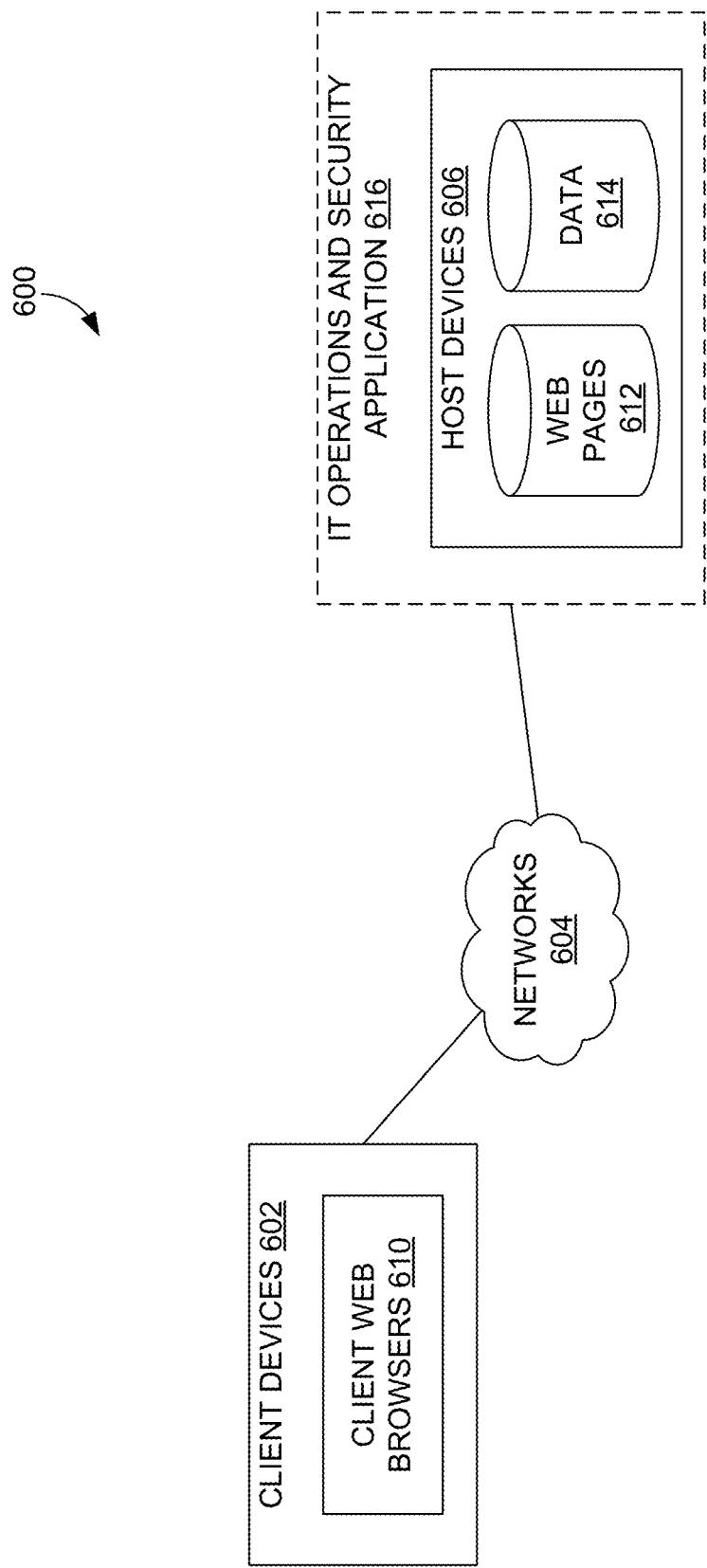
FIG. 6 is an example networked computing environment according to some embodiments.

As indicated above, embodiments described herein include a computer-implemented application that facilitates the display of JavaScript Object Notation (JSON) and other types of hierarchically organized data as part of a web page. FIG. 6 illustrates an example network computing environment 600 in which users using client devices 602 can access web pages or other documents hosted by host devices 606.

In some embodiments, the host devices 606 may be a part of an IT and security operations application 616; however, the host devices 606 generally may be part of any application that provides access to web pages or other documents requested by client devices.

In the example network computing environment 600, client devices 602 represent any computing device capable of interacting with one or more host devices 606 via a network 604. Examples of client devices 602 may include, without limitation, smart phones, tablet computers, handheld computers, wearable devices, laptop computers, desktop computers, servers, portable media players, gaming devices, and so forth. In general, a client device 602 provides access to content provided by one or more host devices 606.

In some embodiments, the client devices 602 include a client web browser 610. In some embodiments the client web browser 610 is a software application configured to retrieve content and other resources from host devices 606 (e.g. a web servers, storage servers, etc.) used to generate graphical user interfaces (GUIs) based on the retrieved content and resources displayed to users of client devices 602. In some embodiments, the client web browser 610 is a mobile application or "app." In some embodiments, each host device 606 stores web page files (e.g., HTML, XML, etc.) representing web pages in web pages storage 612. Each host device 606 may also store JSON data, or other types of hierarchically organized data in data storage 614.

In some embodiments, the host devices 606 are part of an IT operations and security application 616 and store data (e.g., JSON) generated by the IT operations and security application 616. The data can include messages, notifications, alerts, response requests, information regarding detected events/incidents, security actions, the results from the performance of security actions, etc., related to the management of an IT environment.

3.2. Graphical User Interface (GUI) Examples

Figure 7:
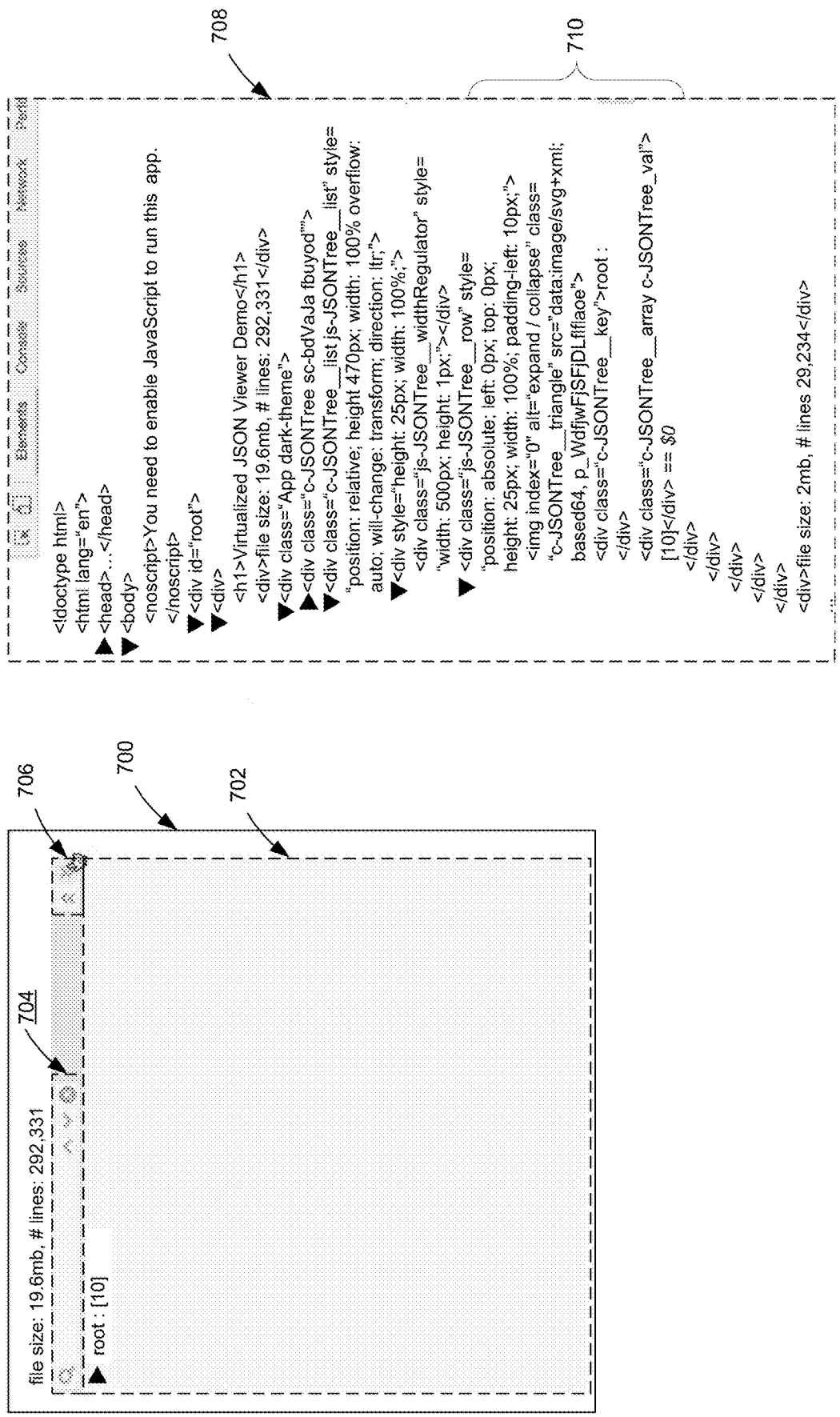
FIG. 7 illustrates an example graphical user interface (GUI) displaying a visual tree representation of JavaScript Object Notation (JSON) data according to some embodiments.

As indicated above, some web applications include web pages that display JSON data using a visual tree representation of the JSON objects contained in the data. For example, a user using a client device may use a web browser or other application to navigate to a web page that includes a JSON tree. FIG. 7 illustrates an example GUI displaying a visual tree representation of JSON data. In the example of FIG. 7, only the root node of a JSON file is currently displayed in a browser window 700. The browser window 700, for example, may be part of a web browser or application running on a client device (e.g., client devices 602). As illustrated in FIG. 7, the browser window 700 displays a web page corresponding to a web page file retrieved from a server (e.g., host devices 608) in data display region 702. In one embodiment, the web page file is an HTML document that includes HTML elements that client-side executable logic (e.g., JavaScript) can modify to display appropriate portions of JSON data from a JSON file. The browser window 700 displays metadata information about the JSON file (e.g., "file size: 19.6 mb, # lines: 292,331"). The contents of a JSON file are represented by key-value, or attribute-value, pairs. As depicted in FIG. 7, the data display region 702 currently displays only one row of JSON objects, "root:[10]," representing a root JSON tree node for the JSON file currently being displayed.

The browser window 700 also includes interface elements 704 and 706. The set of interface elements 704 includes a text entry portion that enables a user to input a search query to locate specific characters, words, or portions of words within the JSON objects of the JSON file. The set of interface elements 704 also include interface elements to enable a user to move up or down through the visual tree structure of JSON objects from the JSON file to cause the display of the search results within data display region 702, and an interface element to cancel or end a search query. The set of interface elements 706 includes interface elements to fully expand the tree nodes of the visual tree structure of JSON objects from the JSON file (e.g., open up all lines of the visual tree structure of the JSON file), or collapse the lines of JSON objects from the JSON file to display only a root JSON tree node of the visual tree structure of the JSON file. It should be noted that even when the interface element to fully expand the tree nodes of the visual tree structure is selected, the client-side executable logic does not generate HTML elements for all of the JSON objects in the JSON data, but instead generates HTML elements for only the portion of the JSON objects visible within the data display region 702. As noted previously, however, the client-side executable logic may generate HTML elements corresponding to additional rows of JSON objects (e.g., one or two rows) not visible within the data display region 702.

FIG. 7 also displays a visual tree representation of the HTML 708 corresponding to the web page displayed in the data display region 702 of browser window 700. The web browser parses the web page file, obtains any associated resources identified in the HTML code (also including, e.g., JavaScript files, CSS, etc.), builds the web page based on the web page file, CSS, JavaScript, etc., and renders the resulting web page for display in the data display region 702 of browser window 700. In one embodiment, when the client device initially requests a web page including a visual tree representation, the client-side executable logic generates an HTML element for only a root node by default. In other embodiments, a number of tree nodes to fill the data display region 702 are generated by default. As only one row of the visual tree structure representing the JSON data of the JSON file, "root:[10]", is displayed in the data display region 702 in the example of FIG. 7, the client-side executable logic modifies the web page to include HTML elements representing the one JSON object representing the root node of the visual tree structure of the JSON file. In some embodiments, the client-side executable logic accesses a list data structure representing the JSON objects of the JSON file to form the HTML elements that are inserted into the DOM representation of the web page maintained by the web browser. In the example of FIG. 7, an HTML element is generated for only the root node of the visual tree structure. This is in contrast to existing web applications that might include HTML elements corresponding to all 292,311 rows/lines of the example JSON file initially, which may cause performance issues on many client devices.

Figure 8:
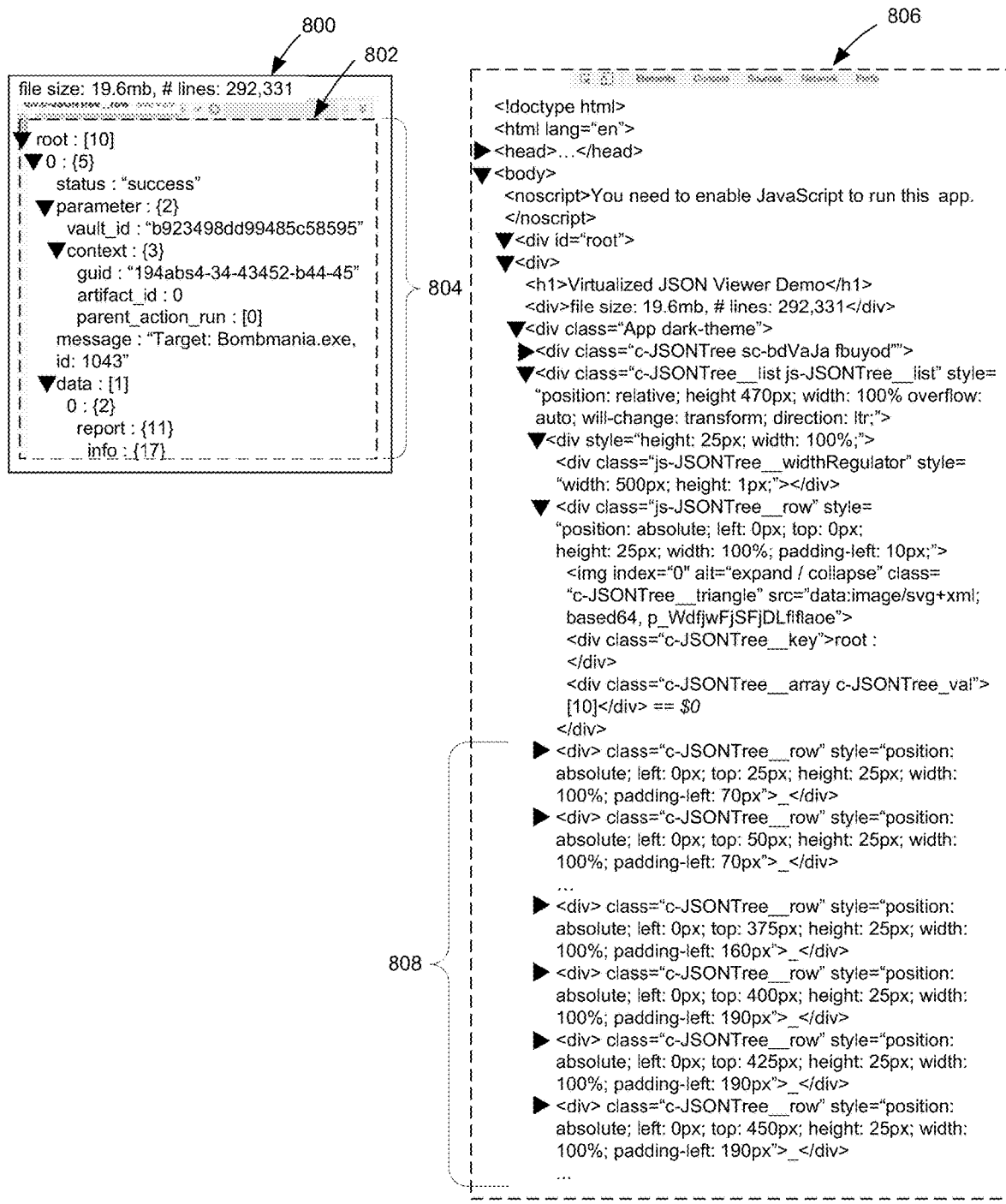
FIG. 8 illustrates another example GUI displaying a visual tree representation of JSON data according to some embodiments.

FIG. 8 illustrates another example GUI displaying a visual tree representation of JSON data according to some embodiments. In the example of FIG. 8, the root node shown in FIG. 7 has been expanded such that some number of child nodes of the root node are displayed in the GUI (for example, in response to a user providing input selecting the root node or performing other interactions with the visual tree representation). The browser window 800 again includes a data display region 802 for displaying a portion of a visual tree structure of JSON objects from the JSON file. FIG. 8 also displays HTML source code 806 corresponding to the web page displayed in data display region 802. In the example of FIG. 8, the size of the data display region 802 accommodates 19 rows of the visual tree representation of the JSON file. In some embodiments, when the client web browser receives a request to expand the root node, as in FIG. 8, the client-side executable logic accesses the list data structure representing the JSON objects of the JSON file, and modifies the web page (e.g., by inserting, removing, or modifying existing DOM nodes) to include HTML elements corresponding to at least 19 JSON objects of the visual tree structure of the JSON file to fill the data display region 802. The web browser then dynamically updates the display of the web page in the data display region 802 to show 19 JSON objects in the visual tree structure based on the modifications.

In some embodiments, the client-side executable logic modifies the web page to include additional rows of the visual tree structure of the JSON file in addition to the number of rows able to be currently displayed in the data display region 802. In some embodiments, the client-side executable logic generates the additional rows as a buffer to speed up the presentation of additional rows (e.g., JSON objects) of the visual tree structure of the JSON file when an input is received to scroll, or otherwise move, through the visual tree structure of the JSON file. In the example of FIG. 8, code 808 includes 21 rows of the visual tree structure of the JSON file (condensed in the figure) and thus the client-side executable logic might modify the web page to include two or more additional rows for display despite those rows not being within the visible display area of the data display region 802.

In some embodiments, the client-side executable logic is similarly configured to modify the visible portion of the visual tree structure of the JSON objects in the JSON file in response to input to scroll up or down through the visual tree structure of the JSON file, in response to a search query causing a matching row of the visual tree structure of the JSON file to be displayed, or in response to any other input requesting the display of at least a portion of the visual tree structure of the JSON file not currently displayed (e.g., expanding or collapsing a JSON object in the visual tree structure of JSON objects), etc.

Figure 9:
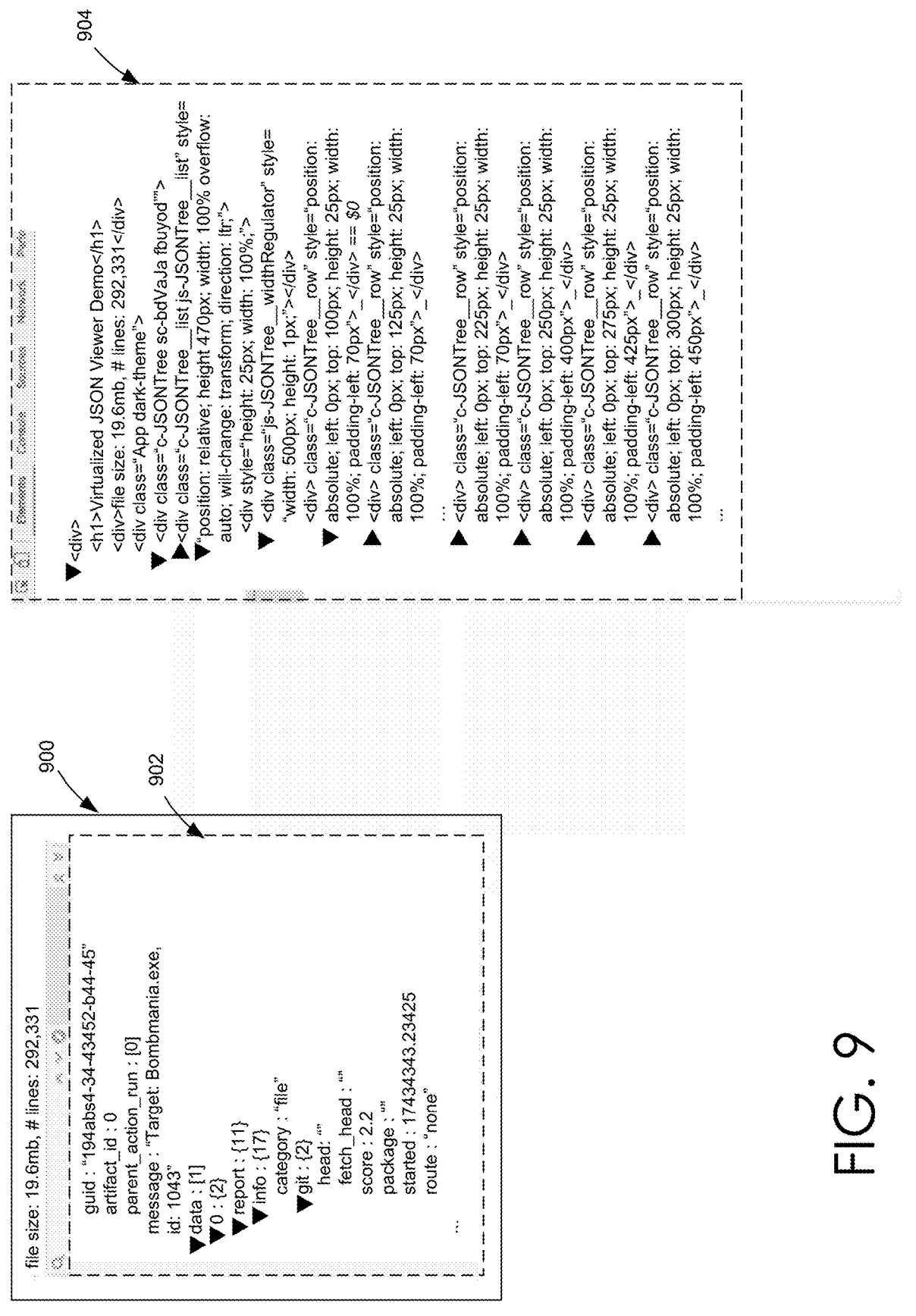

FIG. 9 illustrates another example GUI displaying a visual tree representation of JSON data according to some embodiments. In the example in FIG. 9, the data from the JSON file in the data display region 902 in example browser window 900 has been scrolled down six rows from the data displayed in the data display region 802 in FIG. 8. In some embodiments, in response to a user input causing the six rows (e.g., JSON objects) of the visual tree structure of the JSON data in the JSON file to be scrolled out of the visible display area of the data display region 902, the client-side executable logic modifies the web page to include the new JSON objects from the list data structure representing the JSON objects of the JSON file (e.g., as illustrated by HTML source code 904). In some embodiments, the client-side executable logic inserts, removes, or modifies HTML elements corresponding to at least six JSON objects. For example, one or more of the HTML elements for the JSON objects that are no longer visible in the data display region 902 can be reused for rendering the newly visible rows of JSON objects in the data display region 902.

Figure 10:
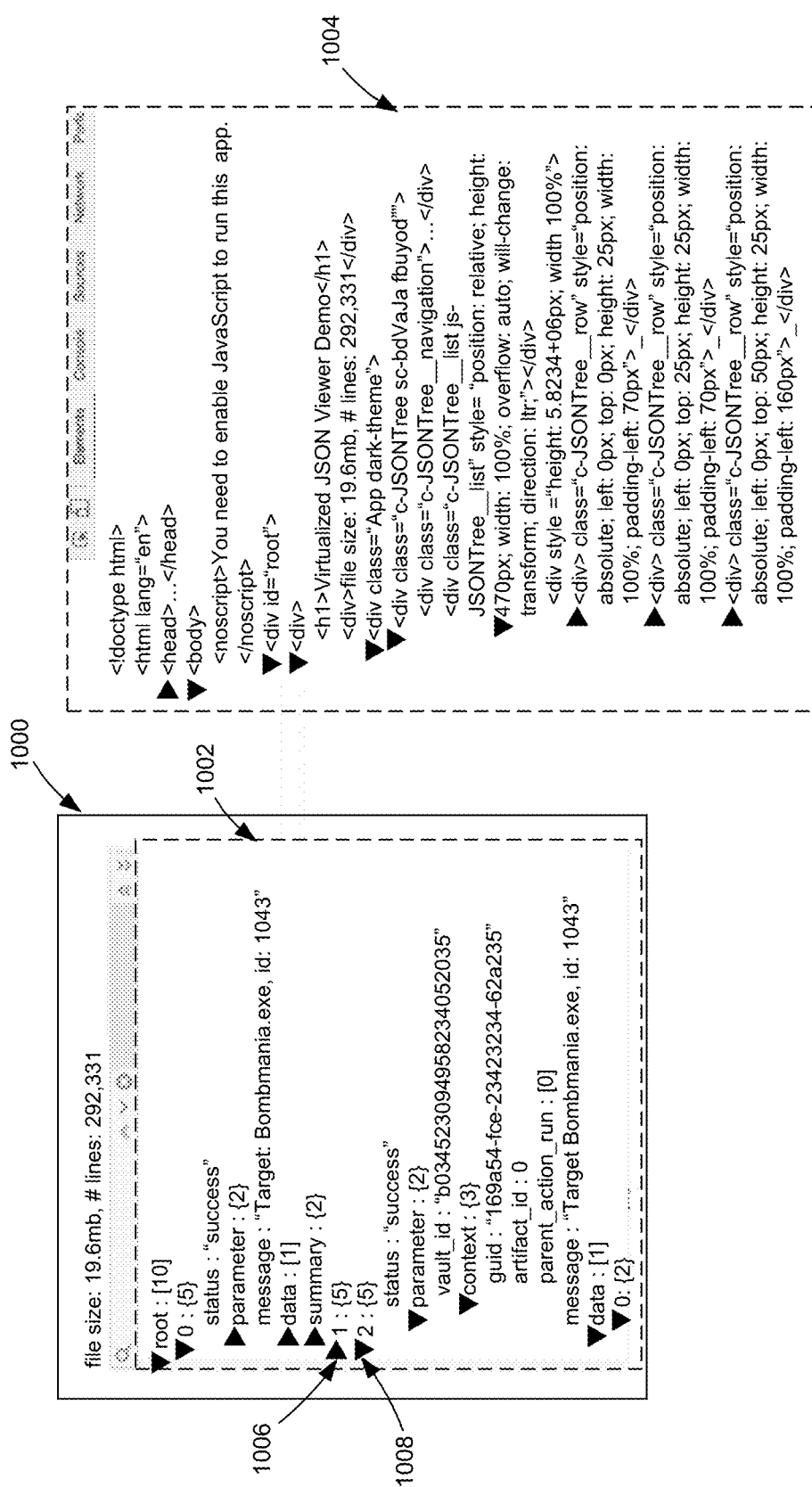
FIG. 10 illustrates another example GUI displaying a visual tree representation of JSON data according to some embodiments.

FIG. 10 illustrates another example GUI displaying a visual tree representation of JSON data according to some embodiments. In some embodiments, when a web browser receives input requesting the expansion or collapsing of a tree node in the visual tree structure of the JSON data, the client-side executable logic modifies the web page displayed in browser window 1000. The input requesting the expansion or collapsing of a tree node causes tree nodes representing JSON objects to shift their locations up or down. When this occurs, a shift value representing the amount of shifting (e.g., the number of rows) caused by the expansion or collapse of a tree node can be propagated through the affected JSON objects in the list data structure representing the JSON objects of the JSON file. For example, in FIG. 10, the browser window 1000 depicts the visual tree structure of the JSON file in data display region 1002 with a number of tree nodes expanded and a number of tree nodes collapsed. In response to an input requesting to expand tree node 1006, the nodes below tree node 1006, including tree node 1008 will be shifted down based on the number of child nodes under tree node 1006. In some embodiments, instead of propagating the shift value to every row (e.g., every sibling node of tree node 1008 and every child node of every sibling node of tree node 1008), which can be time-consuming and resource-intensive, the client-side executable logic only updates the location of the direct siblings of the expanded tree node 1008 in the list data structure. In one example, when tree node 1006 is expanded, only the location of tree node 1008 is modified based on the number of rows it is shifted down (e.g., based on the contents of tree node 1006). In some embodiments, the client-side executable logic can store pending shifts performance when necessary. For example, when the location of another node in the visual tree structure is needed, the client-side executable logic determines whether there are any pending shifts affecting the node, and any pending shifts are applied (e.g., as illustrated by HTML source code 1004).

In some embodiments, the client web browser 610 enables a user to perform search processes on the visual tree structure representing the JSON data in the JSON file. In some embodiments, client web browser 610 receives an input requesting a search query (e.g., via interface element 704 in FIG. 7). Although only a portion of the JSON objects in the JSON file are rendered in the web page document, the client web browser 610 parses the entire list data structure representation of the contents of the JSON file to identify one or more search results from the JSON objects matching the search query. The client web browser 610 modifies one or more DOM nodes of the web page document to display a portion of the JSON data from the list data structure that includes a first tree node representing a first search result of the one or more search results. In some embodiments, where the first search result is a child tree node of a parent tree node, and the parent node is collapsed, the parent tree node is expanded to display the first search result. In response to receiving an input requesting the display of a second search result of the one or more search results, the client web browser 610 modifies the one or more elements of the web page file used to display the visual tree structure to display a second tree node representing the second search result of the one or more search results. Similar to the first search result, the parent node of the second search result is expanded, if necessary, to allow the client web browser 610 to display the second search result.

In some embodiments, contextual data can be generated based on user interactions with the visual tree structure displayed in the web page. In one embodiment, a user interaction with the visual tree structure is treated as a search query separate from the user providing a text input to perform a search. For example, in response to a user selecting or highlighting a string in the web browser, metadata indicating the number of total strings in the JSON file containing the selected or highlighted string can be displayed.

In some embodiments, the client-executable logic is further configured to modify the visual tree structure displayed in the web browser, and the corresponding list data structure representation of the JSON data, in response to user interactions representing edits to the visual tree structure. These user interactions can include adding or deleting JSON objects, annotating JSON objects, etc.

Figure 11:
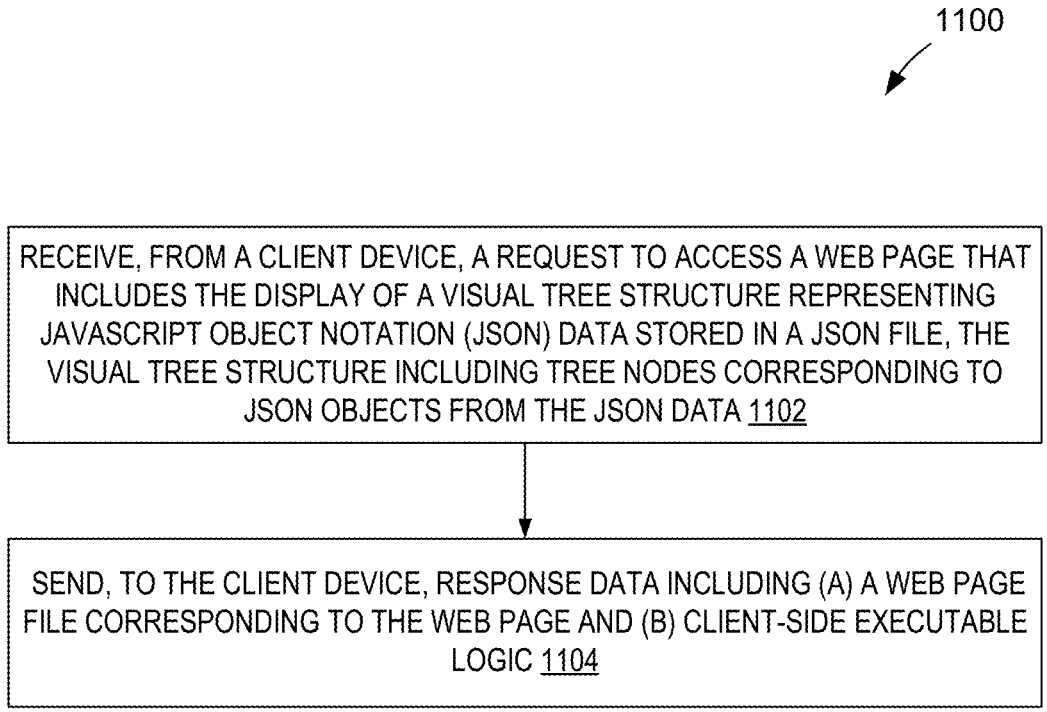
FIG. 11 is a flow diagram illustrating operations of a method for optimizing the display of hierarchically organized data in a web application according to some embodiments.

FIG. 11 is a flow diagram illustrating operations of a method for optimizing the display of hierarchy organized data in a web application according to some embodiments. Some or all of the operations 1100 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1100 are performed by a host device (e.g., one or more of host device 606) of the other figures.

The operations 1100 include, at block 1102, receiving, from a client device, a request to access a web page that includes the display of a visual tree structure representing JavaScript Object Notation (JSON) data stored in a JSON file, the visual tree structure including tree nodes corresponding to JSON objects from the JSON data.

The operations 1100 further include, at block 1104, sending, to the client device, response data including (a) a web page file corresponding to the web page and (b) client-side executable logic. The web page can be based on a HyperText Markup Language (HTML) file or an Extensible Markup Language (XML) file. The web page file, in addition to image, cascading style sheets (CSS), etc., identifies a location of the client-side executable logic for an application (e.g., a client web browser or another application capable of rendering web resources) to download. The client-side executable logic can be JavaScript.

In one embodiment, the response data causes an application running at the client device to: display the web page including the visual tree structure and one or more first tree nodes corresponding to first JSON objects from a first portion of the JSON data, receive input requesting display of one or more second JSON objects from a second portion of the JSON data not currently displayed in the visual tree structure, generate a list of JSON objects including the one or more second JSON objects from the second portion of the JSON data, the list of JSON objects indicating a hierarchy of the one or more second JSON objects, modify one or more elements of the web page used to display the visual tree structure, wherein modifying the one or more elements of the web page includes using the list of JSON objects to update the one or more elements of the web page with data to be used to display the second JSON objects from the second portion of the JSON data, and update display of the visual tree structure to include one or more second tree nodes corresponding to the second JSON objects. Additional details for these operations are described in more detail in FIG. 12.

Figure 12:
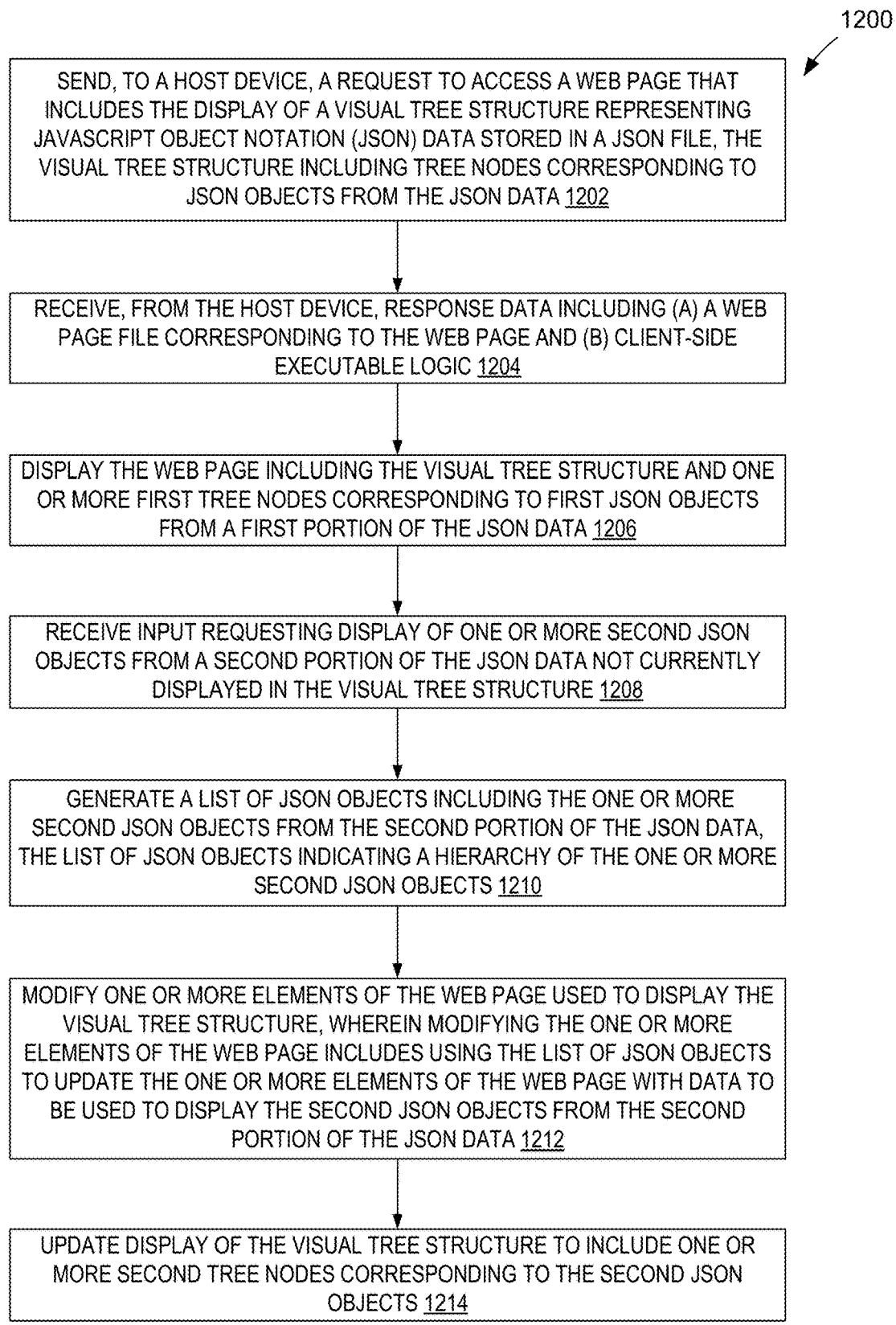
FIG. 12 is a flow diagram illustrating operations of a method for optimizing the display of hierarchically organized data in a web application according to some embodiments.

FIG. 12 is a flow diagram illustrating operations of a method for optimizing the display of hierarchy organized data in a web application according to some embodiments. Some or all of the operations 1200 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1200 are performed by a client device (e.g., one or more of client devices 602), or an application (e.g., web browser) running on the client device, of the other figures.

The operations 1200 include, at block 1202, sending, from a client device to a host device, a request to access a web page that includes the display of a visual tree structure representing JavaScript Object Notation (JSON) data stored in a JSON file, the visual tree structure including tree nodes corresponding to JSON objects from the JSON data The operations 1200 further include, at block 1204, receiving, from the client device, response data including (a) a web page file corresponding to the web page and (b) client-side executable logic. The web page can be based on an HTML file or an XML file. The client-side executable logic can be JavaScript. In one embodiment, the response data further causes the application running at the client device request or retrieve the JSON file. In such embodiments, the host device can send the JSON file to the client device for storage in memory.

In another embodiment, the application running at the client device requests portions of the JSON data on-demand. For example, when the client device receives an input requesting display of a first portion of the JSON data, the client-side executable logic sends a request to the host device requesting the first portion of the JSON data. In such embodiments, the host device can utilize a JSON parser to parse the visual tree structure representing the JSON data to identify the first portion of the visual tree structure representing the first portion of the JSON data and send the first portion of the JSON data to the client device. The client device can then store the first portion of the JSON data in a cache or memory. Subsequently, when the client device receives an input requesting display of a second portion of the JSON data, the client-side executable logic sends a request to the host device requesting the second portion of the JSON data. By operating in this manner, the client device does not have to download the store the entire JSON file locally.

The operations 1200 further include, at block 1206, displaying the web page including the visual tree structure and one or more first tree nodes corresponding to first JSON objects from a first portion of the JSON data. In one embodiment, the number of the one or more first tree nodes is based on a size of a display area of the client device. For example, if the display area of the client device can display up to twenty rows of tree nodes, the number of the one or more first tree nodes can be up to twenty. In one embodiment, the application renders one or more additional tree nodes adjacent to the one or more first tree node corresponding to the first JSON objects. This allows for pre-rendering a minimal number of tree nodes that could be requested by the user in response to a user interaction (e.g., scrolling up or down within the web browser) that can result in different/additional JSON objects beyond the first JSON objects to be displayed in the web page.

The operations 1200 further include, at block 1208, receiving input requesting display of one or more second JSON objects from a second portion of the JSON data not currently displayed in the visual tree structure. In one embodiment, the input requesting the display of the one or more second JSON objects from the second portion of the JSON data not currently displayed in the visual tree structure can be one of, but not limited to, a selection to scroll through the visual tree structure, a selection to expand one or more tree nodes of the visual tree structure, a selection to collapse one or more tree nodes of the visual tree structure, a search query, etc.

In one embodiment, where the input requesting the display of the one or more second JSON objects from a second portion of the JSON data is a request to expand a first tree node of the one or more tree nodes, the application running at the client device propagates a shift value to sibling tree nodes of the expanded first tree node The operations 1200 further include, at block 1210, generating a list of JSON objects including the one or more second JSON objects from the second portion of the JSON data, where the list of JSON objects indicate a hierarchy of the one or more second JSON objects. In one embodiment, the list of JSON objects is a list data structure that maintains the relationship between JSON objects (e.g., parent-child, child-sibling, etc.) in the JSON file, in addition to a current state of the JSON objects (e.g., expanded, collapsed, etc.).

The operations 1200 further include, at block 1212, modifying one or more elements of the web page used to display the visual tree structure. In one embodiment, modifying the one or more elements of the web page includes using the list of JSON objects to update the one or more elements of the web page with data to be used to display the second JSON objects from the second portion of the JSON data. For example, HTML elements corresponding to the determined portion of the JSON data (e.g., the second JSON objects) from the list data structure representing the contents of the JSON file can be inserted into the web page.

The operations 1200 further include, at block 1214, updating display of the visual tree structure to include one or more second tree nodes corresponding to the second JSON objects. In one embodiment, updating the display of the visual tree structure to include the one or more second tree nodes corresponding to the second JSON objects includes updating the list data structure representing the contents of the JSON file to ensure that the list data structure is in sync with the visual tree structure displayed in the web page in response to any user interactions or manipulations of the visual tree structure displayed in the web page.

In one embodiment, the client-side executable logic can be configured to provide a more consistent scrolling experience. As only a portion of the JSON data from the JSON file is displayed at once, input requesting at least some of a different portion of the JSON data, can result in different widths based on the currently displayed JSON data. This is in contrast to existing solutions, where the width of a display area for a list or hierarchically organized data is a fixed size that is determined by the widest element within the entire list. In one embodiment, the client-side executable logic inserts one or more additional DOM elements into the list data structure representation of the contents of the JSON file. In such embodiments, these additional DOM elements can be "invisible," in that they do not contain any data for display on the web page. Instead, these DOM elements can be inserted on-demand based on the maximum width of a currently displayed portion of the JSON data and the maximum width of a requested portions of the JSON data.

Figure 13:
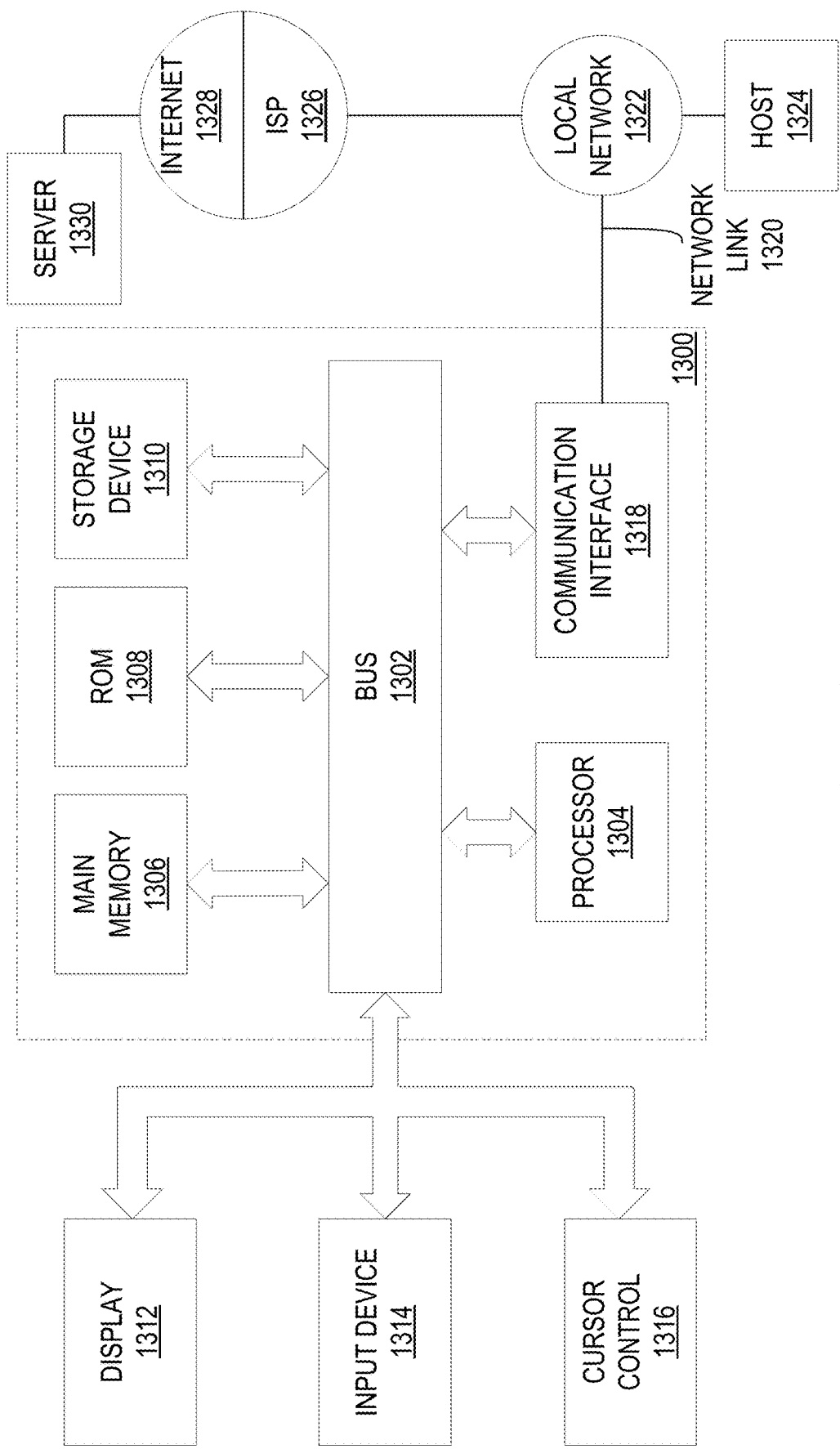
FIG. 13 is a block diagram illustrating a computer system utilized in implementing the techniques described herein according to some embodiments.

FIG. 13 is a block diagram that illustrates a computer system 1300 utilized in implementing the above-described techniques, according to an embodiment. Computer system 1300 may be, for example, a desktop computing device, laptop computing device, tablet, smartphone, server appliance, computing mainframe, multimedia device, handheld device, networking apparatus, or any other suitable device.

Computer system 1300 includes one or more buses 1302 or other communication mechanism for communicating information, and one or more hardware processors 1304 coupled with buses 1302 for processing information. Hardware processors 1304 may be, for example, general purpose microprocessors. Buses 1302 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1300 also includes a main memory 1306, such as a random access memory (RAM) or other dynamic or volatile storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 a special-purpose machine that is customized to perform the operations specified in the instructions.

Computer system 1300 further includes one or more read only memories (ROM) 1308 or other static storage devices coupled to bus 1302 for storing static information and instructions for processor 1304. One or more storage devices 1310, such as a solid-state drive (SSD), magnetic disk, optical disk, or other suitable non-volatile storage device, is provided and coupled to bus 1302 for storing information and instructions.

Computer system 1300 may be coupled via bus 1302 to one or more displays 1312 for presenting information to a computer user. For instance, computer system 1300 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1312 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1312.

One or more input devices 1314 are coupled to bus 1302 for communicating information and command selections to processor 1304. One example of an input device 1314 is a keyboard, including alphanumeric and other keys. Another type of user input device 1314 is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane. Yet other examples of suitable input devices 1314 include a touch-screen panel affixed to a display 1312, cameras, microphones, accelerometers, motion detectors, and/or other sensors. In an embodiment, a network-based input device 1314 may be utilized. In such an embodiment, user input and/or other information or commands may be relayed via routers and/or switches on a Local Area Network (LAN) or other suitable shared network, or via a peer-to-peer network, from the input device 1314 to a network link 1320 on the computer system 1300.

A computer system 1300 may implement techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or a solid-state drive of a remote computer. The remote computer can load the instructions into its dynamic memory and use a modem to send the instructions over a network, such as a cable network or cellular network, as modulate signals. A modem local to computer system 1300 can receive the data on the network and demodulate the signal to decode the transmitted instructions. Appropriate circuitry can then place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

A computer system 1300 may also include, in an embodiment, one or more communication interfaces 1318 coupled to bus 1302. A communication interface 1318 provides a data communication coupling, typically two-way, to a network link 1320 that is connected to a local network 1322. For example, a communication interface 1318 may be an integrated services digital network (ISDN) card, cable modem, satellite modem, or a modem to provide a data communication connection to a corresponding type of telephone line. As another example, the one or more communication interfaces 1318 may include a local area network (LAN) card to provide a data communication connection to a compatible LAN. As yet another example, the one or more communication interfaces 1318 may include a wireless network interface controller, such as a 1302.11-based controller, Bluetooth controller, Long Term Evolution (LTE) modem, and/or other types of wireless interfaces. In any such implementation, communication interface 1318 sends and receives electrical, electromagnetic, or optical signals that carry digital data streams representing various types of information.

Network link 1320 typically provides data communication through one or more networks to other data devices. For example, network link 1320 may provide a connection through local network 1322 to a host computer 1324 or to data equipment operated by a Service Provider 1326. Service Provider 1326, which may for example be an Internet Service Provider (ISP), in turn provides data communication services through a wide area network, such as the world-wide packet data communication network now commonly referred to as the "internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

In an embodiment, computer system 1300 can send messages and receive data, including program code and/or other types of instructions, through the network(s), network link 1320, and communication interface 1318. In the Internet example, a server 1330 might transmit a requested code for an application program through Internet 1328, ISP 1326, local network 1322 and communication interface 1318. The received code may be executed by processor 1304 as it is received, and/or stored in storage device 1310, or other non-volatile storage for later execution. As another example, information received via a network link 1320 may be interpreted and/or processed by a software component of the computer system 1300, such as a web browser, application, or server, which in turn issues instructions based thereon to a processor 1304, possibly via an operating system and/or other intermediate layers of software components.

In an embodiment, some or all of the systems described herein may be or comprise server computer systems, including one or more computer systems 1300 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

What is claimed is:

1. A computer-implemented method comprising:
   receiving, from a client device, a request to access a web page that includes display of a visual tree structure representing JavaScript Object Notation (JSON) data stored in a JSON file, the visual tree structure including tree nodes corresponding to JSON objects from the JSON data; and
   sending, to the client device, response data including (a) a web page file corresponding to the web page and (b) client-side executable logic, the response data causing an application running at the client device to:
      display the web page including the visual tree structure and one or more first tree nodes corresponding to first JSON objects from a first portion of the JSON data,
      receive input requesting display of one or more second JSON objects from a second portion of the JSON data not currently displayed in the visual tree structure,
      generate a list of JSON objects including the one or more second JSON objects from the second portion of the JSON data, the list of JSON objects indicating a hierarchy of the one or more second JSON objects,
      modify one or more elements of the web page used to display the visual tree structure, wherein modifying the one or more elements of the web page includes using the list of JSON objects to update the one or more elements of the web page with data to be used to display the second JSON objects from the second portion of the JSON data, and
      update display of the visual tree structure to include one or more second tree nodes corresponding to the one or more second JSON objects.

2. The computer-implemented method of claim 1, wherein the input requesting the display of the one or more second JSON objects from the second portion of the JSON data not currently displayed in the visual tree structure is one of: input to scroll through the visual tree structure, input to expand one or more tree nodes of the visual tree structure, and input to collapse one or more tree nodes of the visual tree structure.

3. The computer-implemented method of claim 1, wherein a number of the one or more first tree nodes is based at least in part on a size of a display area of the application.

4. The computer-implemented method of claim 1, wherein the web page is based on a HyperText Markup Language (HTML) file or an Extensible Markup Language (XML) file.

5. The computer-implemented method of claim 1, wherein the client-side executable logic is based on JavaScript.

6. The computer-implemented method of claim 1, wherein the application is a web browser capable of rendering the web page and executing the client-side executable logic.

7. The computer-implemented method of claim 1, wherein the response data further causes the application running at the client device to render one or more third tree nodes adjacent to the one or more first tree node corresponding to the first JSON objects.

8. The computer-implemented method of claim 1, wherein the input requesting the display of the one or more second JSON objects from a second portion of the JSON data is a request to expand a first tree node of the one or more tree nodes, and wherein the request to expand the first tree node of the one or more tree nodes causes the application running at the client device to propagate a shift value to sibling tree nodes of the expanded first tree node.

9. The computer-implemented method of claim 1, wherein the input requesting the display of the one or more second JSON objects from a second portion of the JSON data is a request to collapse a first tree node of the one or more tree nodes, and wherein the request to collapse the first tree node of the one or more tree nodes causes the application running at the client device to store a state of each of one or more child nodes of the first tree node.

10. The computer-implemented method of claim 1, further comprising:
    receiving, from the client device, a request for the first portion of the visual tree structure representing the JSON data;
    parsing the visual tree structure representing the JSON data to identify the first portion of the visual tree structure representing the JSON data; and
    sending, to the client device, the first portion of the visual tree structure representing the JSON data.

11. The computer-implemented method of claim 1, wherein receiving the input requesting the display of the one or more second JSON objects from the second portion of the JSON data not currently displayed in the visual tree structure the response data further causes the application running at the client device to:
    request the second portion the JSON data;

receive the second portion of the JSON data; and
store the second portion JSON data in a memory.

12. The computer-implemented method of claim 1, wherein the response data further causes the application running at the client device to:
retrieve the JSON file; and
store the JSON file in a memory.

13. The computer-implemented method of claim 1, wherein the response data further causes the application running at the client device to:
receive input representing a search query for a search process on the JSON objects from the JSON data;
identify one or more search results from the JSON objects matching the search query;
modify the one or more elements of the web page file used to display the visual tree structure to display a first tree node representing a first search result of the one or more search results;
receive input requesting display of a second search result of the one or more search results; and
modify the one or more elements of the web page file used to display the visual tree structure to display a second tree node representing the second search result of the one or more search results.

14. The computer-implemented method of claim 1, wherein updating the display of the visual tree structure to include the one or more second tree nodes corresponding to the second JSON objects includes updating the list of JSON objects.

15. The computer-implemented method of claim 1, wherein the response data further causes the application running at the client device to:
receive input representing a search query for a search process on the JSON objects from the JSON data; and
display metadata including a value indicating a number of tree nodes in the JSON data satisfying the search query.

16. The computer-implemented method of claim 1, wherein the response data further causes the application running at the client device to:
receive input representing an edit to one or more JSON objects from the JSON data; and
update the list of JSON objects to include the edit to the one or more JSON objects.

17. A non-transitory computer-readable storage medium storing instructions which, when executed by one or more processors, cause performance of operations comprising:
receiving, from a client device, a request to access a web page that includes display of a visual tree structure representing JavaScript Object Notation (JSON) data stored in a JSON file, the visual tree structure including tree nodes corresponding to JSON objects from the JSON data; and
sending, to the client device, response data including (a) a web page file corresponding to the web page and (b) client-side executable logic, the response data causing an application running at the client device to:
display the web page including the visual tree structure and one or more first tree nodes corresponding to first JSON objects from a first portion of the JSON data,
receive input requesting display of one or more second JSON objects from a second portion of the JSON data not currently displayed in the visual tree structure,
generate a list of JSON objects including the one or more second JSON objects from the second portion of the JSON data, the list of JSON objects indicating a hierarchy of the one or more second JSON objects,
modify one or more elements of the web page used to display the visual tree structure, wherein modifying the one or more elements of the web page includes using the list of JSON objects to update the one or more elements of the web page with data to be used to display the second JSON objects from the second portion of the JSON data, and
update display of the visual tree structure to include one or more second tree nodes corresponding to the one or more second JSON objects.

18. The non-transitory computer-readable storage medium of claim 17, wherein the input requesting the display of the one or more second JSON objects from the second portion of the JSON data not currently displayed in the visual tree structure is one of: input to scroll through the visual tree structure, input to expand one or more tree nodes of the visual tree structure, and input to collapse one or more tree nodes of the visual tree structure.

19. The non-transitory computer-readable storage medium of claim 17, wherein a number of the one or more first tree nodes is based at least in part on a size of a display area of the application.

20. The non-transitory computer-readable storage medium of claim 17, wherein the response data further causes the application running at the client device to render one or more third tree nodes adjacent to the one or more first tree node corresponding to the first JSON objects.

21. The non-transitory computer-readable storage medium of claim 17, wherein the input requesting the display of the one or more second JSON objects from a second portion of the JSON data is a request to expand a first tree node of the one or more tree nodes, and wherein the request to expand the first tree node of the one or more tree nodes causes the application running at the client device to propagate a shift value to sibling tree nodes of the expanded first tree node.

22. The non-transitory computer-readable storage medium of claim 17, wherein the input requesting the display of the one or more second JSON objects from a second portion of the JSON data is a request to collapse a first tree node of the one or more tree nodes, and wherein the request to collapse the first tree node of the one or more tree nodes causes the application running at the client device to store a state of each of one or more child nodes of the first tree node.

23. The non-transitory computer-readable storage medium of claim 17, wherein the instructions further cause performance of operations comprising:
receiving, from the client device, a request for the first portion of the visual tree structure representing the JSON data;
parsing the visual tree structure representing the JSON data to identify the first portion of the visual tree structure representing the JSON data; and
sending, to the client device, the first portion of the visual tree structure representing the JSON data.

24. An apparatus, comprising:
one or more processors;
a non-transitory computer-readable storage medium storing instructions which, when executed by the one or more processors, causes the apparatus to:
receive, from a client device, a request to access a web page that includes display of a visual tree structure representing JavaScript Object Notation (JSON) data stored in a JSON file, the visual tree structure including tree nodes corresponding to JSON objects from the JSON data; and send, to the client device, response data including (a) a web page file corresponding to the web page and (b) client-side executable logic, the response data causing an application running at the client device to:

display the web page including the visual tree structure and one or more first tree nodes corresponding to first JSON objects from a first portion of the JSON data, receive input requesting display of one or more second JSON objects from a second portion of the JSON data not currently displayed in the visual tree structure, generate a list of JSON objects including the one or more second JSON objects from the second portion of the JSON data, the list of JSON objects indicating a hierarchy of the one or more second JSON objects, modify one or more elements of the web page used to display the visual tree structure, wherein modifying the one or more elements of the web page includes using the list of JSON objects to update the one or more elements of the web page with data to be used to display the second JSON objects from the second portion of the JSON data, and update display of the visual tree structure to include one or more second tree nodes corresponding to the one or more second JSON objects.

25. The apparatus of claim 24, wherein the input requesting the display of the one or more second JSON objects from the second portion of the JSON data not currently displayed in the visual tree structure is one of: input to scroll through the visual tree structure, input to expand one or more tree nodes of the visual tree structure, and input to collapse one or more tree nodes of the visual tree structure.

26. The apparatus of claim 24, wherein a number of the one or more first tree nodes is based at least in part on a size of a display area of the application.

27. The apparatus of claim 24, wherein the response data further causes the application running at the client device to render one or more third tree nodes adjacent to the one or more first tree node corresponding to the first JSON objects.

28. The apparatus of claim 24, wherein the input requesting the display of the one or more second JSON objects from a second portion of the JSON data is a request to expand a first tree node of the one or more tree nodes, and wherein the request to expand the first tree node of the one or more tree nodes causes the application running at the client device to propagate a shift value to sibling tree nodes of the expanded first tree node.

29. The apparatus of claim 24, wherein the input requesting the display of the one or more second JSON objects from a second portion of the JSON data is a request to collapse a first tree node of the one or more tree nodes, and wherein the request to collapse the first tree node of the one or more tree nodes causes the application running at the client device to store a state of each of one or more child nodes of the first tree node.

30. The apparatus of claim 24, wherein the instructions, when executed by the one or more processors, further cause the apparatus to:

receive, from the client device, a request for the first portion of the visual tree structure representing the JSON data;

parse the visual tree structure representing the JSON data to identify the first portion of the visual tree structure representing the JSON data; and send, to the client device, the first portion of the visual tree structure representing the JSON data.

* * * * *